(12) United States Patent
Hashima et al.

(10) Patent No.: US 6,950,787 B2
(45) Date of Patent: Sep. 27, 2005

(54) APPARATUS AND METHOD FOR SIMULATING TRANSPORTATION OF FLEXIBLE MEDIUM, AND COMPUTER-READABLE RECORDING MEDIUM HAVING FLEXIBLE MEDIUM TRANSPORT SIMULATION PROGRAM RECORDED THEREON

(75) Inventors: Masayoshi Hashima, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 831 days.

(21) Appl. No.: 09/822,465

(22) Filed: Apr. 2, 2001

(65) Prior Publication Data

US 2002/0052723 A1 May 2, 2002

(30) Foreign Application Priority Data

Nov. 2, 2000 (JP) ........................................ 2000-336358

(51) Int. Cl.$^7$ .............................................. G06F 17/50
(52) U.S. Cl. .................................. 703/2; 703/6; 399/18
(58) Field of Search ........................... 703/2, 6; 399/18; 271/251; 706/6, 26

(56) References Cited

U.S. PATENT DOCUMENTS 3,825,251 A * 7/1974 Beery et al. ............ 271/258.03
5,570,280 A * 10/1996 Nunnally et al. ............. 700/48
5,838,596 A   11/1998 Shimomura et al.
6,712,356 B2 * 3/2004 Daout et al. ................. 271/250

FOREIGN PATENT DOCUMENTS

| JP | 1314472 | 12/1989 | .......... H04N/1/387 |
| JP | HEI 9-309665 | 12/1997 | .......... G65H/43/00 |

* cited by examiner

Primary Examiner—Thai Phan
(74) Attorney, Agent, or Firm—Staas & Halsey LLP

(57) ABSTRACT

The present invention enables real-time and three-dimensional display of transport of a flexible medium by a simple method. To this end, in the present invention, a position/posture computation section computes a three-dimensional transport position of the flexible medium and computes two-dimensional posture of the flexible medium based on the dimensional information about the flexible medium, on the three-dimensional transport path set, and on the travel amount information. A three-dimensional image preparation section prepares a three-dimensional image of the flexible medium either based on the three-dimensional transport position or the two-dimensional posture and on the dimensional information, and outputs the three-dimensional image as the result of the simulation. The present invention is employed in simulating transport of a sheet-like flexible medium; for example, paper, paper money, bankbooks, postcards, tickets, cards, and photographic films, in an apparatus for transporting the sheet-like medium (a printer, a copier, a facsimile, and an ATM).

23 Claims, 20 Drawing Sheets

FIG. 11
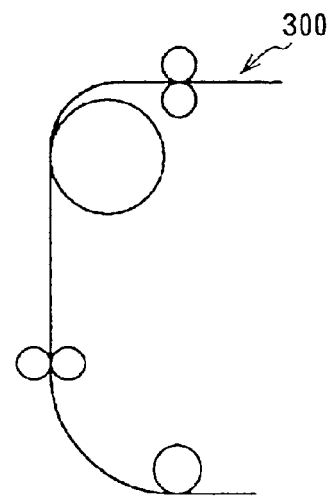
FIG. 12A
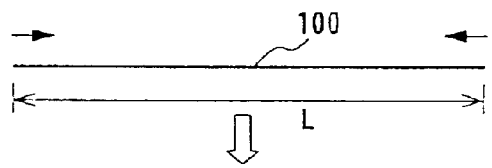
FIG. 12B
FIG. 13A
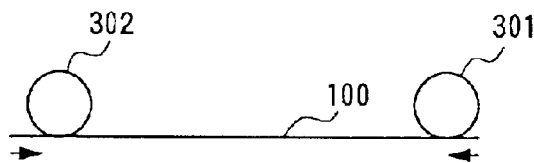
FIG. 13B
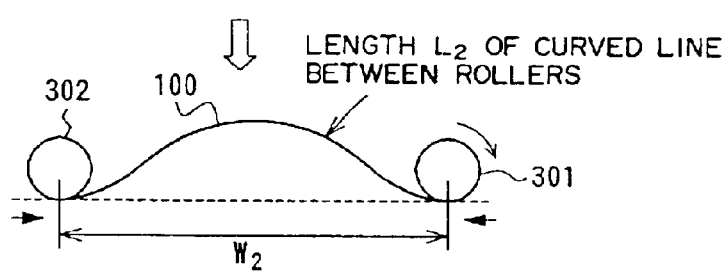

F I G. 16A
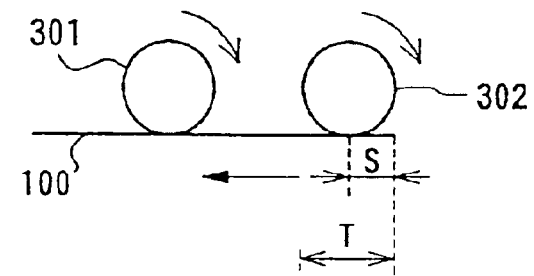
F I G. 16B
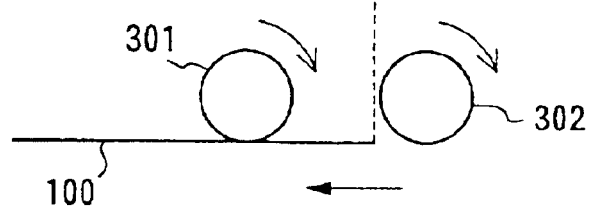
F I G. 17A
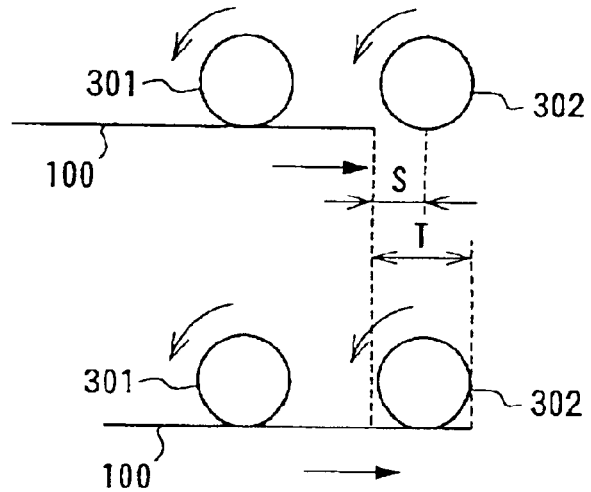
F I G. 17B
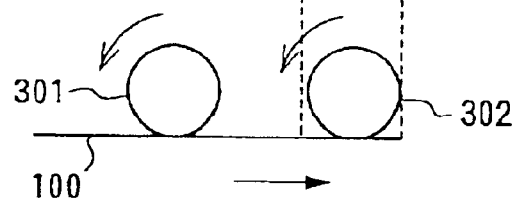

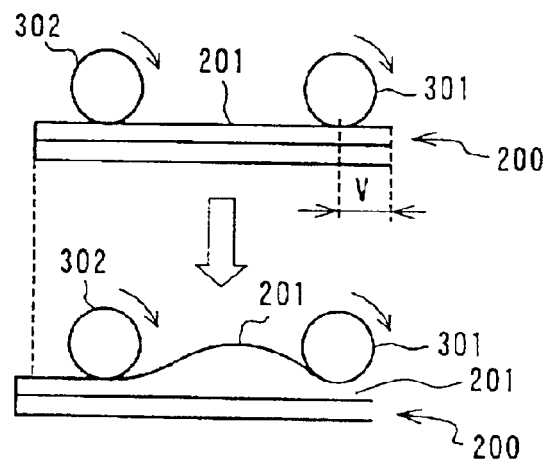
FIG. 22A
FIG. 22B
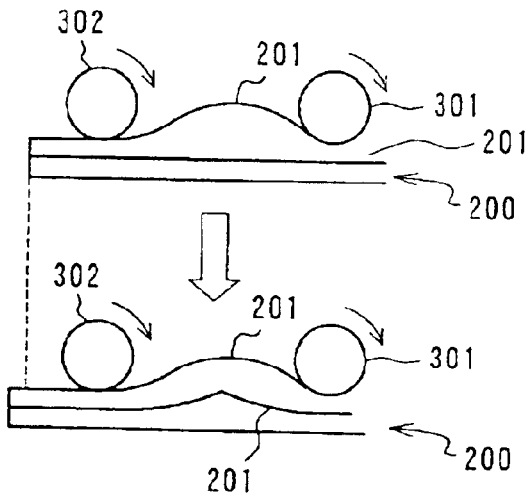
FIG. 23A
FIG. 23B
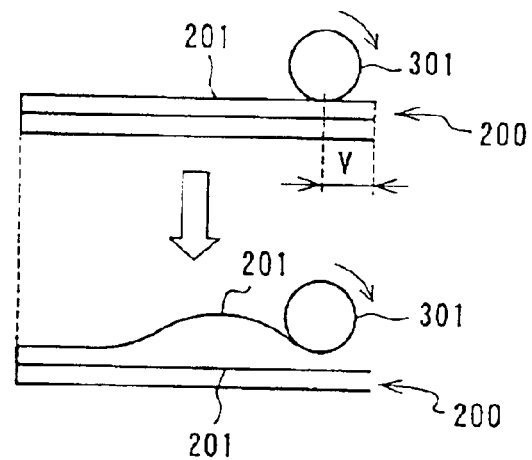
FIG. 24A
FIG. 24B

APPARATUS AND METHOD FOR SIMULATING TRANSPORTATION OF FLEXIBLE MEDIUM, AND COMPUTER-READABLE RECORDING MEDIUM HAVING FLEXIBLE MEDIUM TRANSPORT SIMULATION PROGRAM RECORDED THEREON

BACKGROUND OF THE INVENTION

1) Field of the Invention

The present invention relates to an apparatus and method for effecting simulation and three-dimensional display of transportation of flexible mediums in a system for transporting sheet-like flexible mediums (hereinafter referred to as "flexible mediums"), such as paper, paper money, bankbooks, postcards, tickets, various types of cards, and photographic films, as well as to a computer-readable recording medium having recorded thereon a flexible medium transport simulation program for implementing the apparatus and method. Specific systems which would be subjects of simulation according to the present invention include printers, copiers, and facsimiles, which transport paper as a flexible medium, and ATM (Automatic Teller Machines) for transporting paper money and bankbooks as flexible mediums.

2) Description of the Related Art

The following two techniques have hitherto been employed for simulating transportation of the above-described flexible mediums in a transport system.

One is a technique (i.e., a simulation apparatus for use with a paper feed transport control sequence) described in Japanese Patent Application Laid-Open No. 309665/1997 (U.S. Pat. No. 5,838,596). According to this technique, information about travel of paper, which is a flexible medium (i.e., information about a paper transport path), is set beforehand. The paper is expressed through use of both ends of the paper and the length thereof, and travel of the paper is computed and displayed.

The other technique is known as a simulator (e.g., structural analysis software), such as a Dynamic Analysis and Design System (DADS) (produced by Cybernet Inc.). The simulator performs precise dynamic computation of travel of a flexible medium, thereby effecting three-dimensional analysis and display of transportation of a flexible medium.

At the time of development of a control program (firmware) for use with an apparatus having a mechanism of transporting flexible medium, such as a printer, a copier, a facsimile, or an ATM, or at the time of review of transportation of a flexible medium in such an apparatus, a person in charge of program development or review desires to thoroughly perceive transportation of a flexible medium by means of viewing transportation which is simulated and is three-dimensionally displayed on a display.

For instance, at the time of development of a control program, there is a desire for simulating transportation of a flexible medium in real time in conjunction with the control program and verifying the control program while visually ascertaining transportation of a flexible medium.

In order to review the result of design of the apparatus, there is a desire for simulating transportation of a flexible medium in real time in response to a transport instruction issued on the spot and for ability to display transportation as three-dimensional animated images.

In contrast to these desires, the former technique fails to take into consideration information about the width of a paper sheet (flexible medium) and fails to take into consideration information about the motion (being set in advance) of the paper sheet in the depthwise direction with respect the transport direction. Naturally, a difference in the width, or the depth in the motion, of paper sheets or disposition of the paper sheets in a depthwise direction, cannot be displayed. In other words, transportation of a paper sheet cannot be displayed three-dimensionally on a display. A person in charge of program development or review fails to view transportation of paper three-dimensionally and becomes unable to thoroughly perceive transportation.

The latter technique involves precise dynamic computation, and hence analysis of transportation requires a great deal of time, which in turn hinders real-time simulation of transportation of a flexible medium. Accordingly, there has hitherto been a problem of incapability of effecting transportation in conjunction with a control program or effecting real-time, three-dimensional display of transportation in accordance with a transport instruction.

SUMMARY OF THE INVENTION

The present invention has been conceived in view of such a problem and is aimed at enabling real-time and three-dimensional display of transport of a flexible medium using a simple method and enabling three-dimensional observation and thorough ascertainment of transport of the flexible medium.

To this end, the present invention provides a flexible medium transport simulation apparatus which simulates transport of a sheet-like flexible medium in a transport mechanism and three-dimensionally displays the simulated transport. The apparatus comprises: a flexible medium setting section for setting the length and the width of the flexible medium as dimensional information, the length being a measurement in a transport direction in which the flexible medium is transported and the width being a measurement in a widthwise direction which is perpendicular to the transport direction with respect to a plane on which the flexible medium is transported; a transport path setting section for setting a three-dimensional transport path covering a widthwise deviation of the flexible medium, along which path the flexible medium is transported in the transport mechanism; a travel amount information input section for inputting travel amount information about an amount of travel of the flexible medium; a simulation section for simulating the transport of the flexible medium carried out by the transport mechanism, by using a three-dimensional mechanism model of the transport mechanism being constructed inside the simulation section; a display for displaying the transport of the flexible medium; and a display control section for controlling the display so as to display a result of the simulation performed by the simulation section. The simulation section comprises: a position/posture computation section which computes a three-dimensional transport position of the flexible medium along the three-dimensional transport path, and also computes a two-dimensional posture of the flexible medium in a plane orthogonal to the widthwise direction, on the basis of the dimensional information, which is set by the flexible medium setting section, of the three-dimensional transport path, which is set by the transport path setting section, and of the travel amount information, which is input by the travel amount information input section; and a three-dimensional image preparation section which prepares a three-dimensional image of the flexible medium on the basis of the three-dimensional transport position or the two-dimensional posture, which is computed by the position/posture computation section, and of the dimensional information, which is set by the flexible medium setting section, and outputs the three-dimensional image as the result of the simulation.

Preferably, the travel amount information input section is a pointing device adapted to be operated by a user, and a three-dimensional image of the flexible medium appearing on the display is operated by use of the pointing device, with the result that the amount of operation of the three-dimensional image is input to the simulation section as the travel amount information. Alternatively, an image, appearing on the display, of a component of the transport mechanism, which component acts on the flexible medium, is operated by use of the pointing device, with the result that the amount of operation of the component image is input to the simulation section as the travel amount information.

Preferably, the travel amount information input section is a control program execution section which executes a control program for controlling the operation of the transport mechanism and computes an amount of control of a component of the transport mechanism, which component acts on the flexible medium, and the amount of control computed by the control program execution section is then input to the simulation section as the travel amount information.

Preferably, the simulation section handles the flexible medium as a three-dimensional model, and the model is constituted by means of interconnecting a plurality of strip-shaped members so as to be rotatable about an axis parallel to the widthwise direction.

Further, the present invention provides a method of simulating transport of a sheet-like flexible medium in a transport mechanism and three-dimensionally displaying the simulated transport. The method comprises: a flexible medium setting step for setting the length and the width of the flexible medium as dimensional information, the length being a measurement in a transport direction in which the flexible medium is transported and the width being a measurement in a widthwise direction which is perpendicular to the transport direction with respect to a plane on which the flexible medium is transported; a transport path setting step for setting a three-dimensional transport path covering a widthwise deviation of the flexible medium, along which path the flexible medium is transported in the transport mechanism; a travel amount information input step for inputting travel amount information about an amount of travel of the flexible medium; a simulation step for simulating the transport of the flexible medium carried out by the transport mechanism, with use of a three-dimensional mechanism model of the transport mechanism; and a display step for displaying the transport of the flexible medium, simulated in the simulation step, on a display. The simulation step includes: a position/posture computation step for computing a three-dimensional transport position of the flexible medium along the three-dimensional transport path, and also computes a two-dimensional posture of the flexible medium in a plane orthogonal to the widthwise direction, on the basis of the dimensional information, which is set in the flexible medium setting step, of the three-dimensional transport path, which is set in the transport path setting step, and of the travel amount information, which is input in the travel amount information input step; and a three-dimensional image preparation step for preparing a three-dimensional image of the flexible medium on the basis of the three-dimensional transport position or the two-dimensional posture, which is computed in the position/posture computation step, and of the dimensional information, which is set in the flexible medium setting step, and outputting the three-dimensional image as the result of the simulation.

The present invention also provides a computer-readable recording medium which stores a flexible medium transport simulation program for instructing a computer to execute functions of simulating transport of a sheet-like flexible medium in a transport mechanism and of three-dimensionally displaying the simulated transport. The flexible medium transport simulation program instructs the computer to function as: a transport path setting section for setting a three-dimensional transport path covering a widthwise deviation of the flexible medium, along which path the flexible medium is transported in the transport mechanism; a travel amount information input section for inputting travel amount information about an amount of travel, starting from a predetermined position, of the flexible medium; a simulation section for simulating the transport of the flexible medium carried out by the transport mechanism, by using a three-dimensional mechanism model of the transport mechanism being constructed inside the simulation section; and a display control section for controlling a display so as to display a result of the simulation performed by the simulation section. The computer, when it functions as the simulation section, is instructed to function as: a position/posture computation section which computes a three-dimensional transport position of the flexible medium along the three-dimensional transport path, and also computes a two-dimensional posture of the flexible medium in a plane orthogonal to the widthwise direction, on the basis of dimensional information set in advance, of the three-dimensional transport path, which is set by the transport path setting section, and of the travel amount information, which is input by the travel amount information input section; and a three-dimensional image preparation section which prepares a three-dimensional image of the flexible medium on the basis of the three-dimensional transport position or the two-dimensional posture, which is computed by the position/posture computation section, and of the dimensional information, and outputs the three-dimensional image as the result of the simulation.

According to the present invention, by means of the construction set forth, the transport position of the flexible medium is computed and simulated on the basis of the preset three-dimensional transport path.

The posture of the flexible medium is two-dimensionally computed and simulated. The three-dimensional image generation section easily prepares a three-dimensional image of the flexible medium, by giving consideration to dimensional information (about a length in a widthwise direction) concerning the flexible medium and also to the three-dimensional transport position or two-dimensional posture computed by the position/posture computation section. The thus-prepared three-dimensional image appears on the display as the result of simulation (i.e., transport of the flexible medium). In short, transport of the flexible medium can be displayed three-dimensionally and in real time by means of a simple method.

At this time, a three-dimensional image of the flexible medium appearing on the display or an image of a constituent component of the transport mechanism (e.g., an image of a roller) is operated by use of a pointing device which acts as the travel amount information input section, whereby the amount of operation of the three-dimensional image can be input to the simulation section as travel amount information. In short, the travel amount information (i.e., a transport instruction) entered by means of the pointing device while an image appearing on the display is being referred to, is immediately reflected in simulation of transport of the flexible medium, and the transporting action according with the travel amount information can be displayed three-dimensionally and in real time.

The amount of control computed by the control program execution section which acts as the travel amount information input section is input to the simulation section as travel amount information. As a result, transport of the flexible medium is simulated in real time in conjunction with the control program, and transport operation according with the amount of control is displayed in real time and three-dimensionally.

The apparatus and method for simulating transport of a flexible medium and the computer-readable recording medium having recorded thereon a flexible medium transport simulation program, which pertain to the present invention, yield the following effects and advantages.

[1] A three-dimensional image of a flexible medium is readily prepared, and the three-dimensional image is displayed on a display. Accordingly, transport of the flexible medium can be displayed three-dimensionally and in real time by means of a simple method. Transport of the flexible medium can be viewed three-dimensionally and perceived thoroughly.

[2] Since the transport position of the flexible medium on the three-dimensional transport path is displayed, the operating status of a sensor which enables detection of interference with guides capable of regulating widthwise movement of the flexible medium or detection of the widthwise position of the flexible medium can be readily ascertained. Deviation of the flexible medium in the widthwise direction (i.e., the depthwise direction) (i.e., the state of sidewise sliding or skewing) can be reproduced and displayed.

[3] The travel amount information entered by means of the pointing device while the three-dimensional image appearing on the display is being referred to is immediately reflected in simulation of transport of the flexible medium, and the transporting action according with the travel amount information can be displayed three-dimensionally in real time. For instance, in the case of review of design results of an apparatus having a transport mechanism, transport of a flexible medium can be indicated in the form of a real-time three-dimensional animation while transport operation is instructed on the spot by use of the pointing device, thereby enabling a person in charge to visually review and perceive the design results without fail.

[4] The travel amount information concerning the flexible medium can be entered into the simulation section, even by means of manipulating an image of a constituent component (e.g., an image of a roller) of the transport mechanism through use of the pointing device. Hence, a certain constituent component is specified, and transport of the flexible medium resulting from operation of the constituent component can be displayed three-dimensionally and in real time, thus enabling easy ascertainment of the operating state of the constituent component.

[5] The amount of control (i.e., travel amount information) output from the control program execution section is immediately reflected in simulation of transport of the flexible medium. Transporting operation according with the amount of control is displayed three-dimensionally and in real time. Hence, at the time of development of a control program for use with an apparatus having a transport mechanism, transport of the flexible medium associated with the control program is displayed in the form of a real-time, three-dimensional animation image. Thus, a person in charge of developing a program can visually ascertain the transporting operation without fail, thus greatly contributing to an increase in the efficiency of development of a control program.

[6] A travel ratio (i.e., a ratio of travel of a flexible medium to rotation of a roller which comes into contact with and acts on the flexible medium) changes in accordance with the status of rubber constituting a roller and the status of the flexible medium. Hence, transport of the flexible medium can be simulated in various situations by means of freely setting the travel ratio. At this time, the travel ratio can also be randomly set in accordance with a predetermined statistical distribution. In this case, changes randomly arising in situations can be reflected in simulation of transport operation.

[7] A sheet-like flexible medium is handled as a three-dimensional model which is constituted by means of interconnecting a plurality of strip-shaped members so as to be mutually rotatable. Variations in the posture of the flexible medium can be three-dimensionally simulated with just an operation of changing angles between adjacent strip-shaped members. Accordingly, computation of posture of the flexible medium can be significantly simplified, and a three-dimensional image of the flexible medium can be very easily produced.

[8] The three-dimensional transport path or two-dimensional posture of the flexible medium is expressed through use of circular arcs and straight lines. Computation of the three-dimensional transport position and two-dimensional posture of the flexible medium can be facilitated greatly.

[9] When the travel amount information is input by means of the travel amount information input section while a load center of the force applied for putting the flexible medium in motion is fixed on the flexible medium, the position/posture computation section computes the two-dimensional posture of the flexible medium from the input travel amount information and from the position of the fixed load center (hereinafter referred to as "stationary load center") on the flexible medium. Therefore, if a position on the flexible medium is designated as the stationary load center, it is possible to simulate the two-dimensional posture of the flexible medium in a case where the force is applied to the designated position, and to display the result of the simulation on the display as a three-dimensional image. Accordingly, the user can three-dimensionally view and perceive situations in which the previously-described force acts on the flexible medium, without fail.

[10] At this time, in a case where the flexible medium is a notebook-shaped medium (bankbook) consisting of a plurality of leaves, the position of the stationary load center is limited to an externally-exposed leaf of the note book-shaped medium. Turning over through leaves can be readily reproduced on the display.

[11] When travel amount information is entered by means of the travel amount information input section such that a position of a load center of the force applied for putting the flexible medium in motion is shifted on the flexible medium, the position/posture computation section computes the two-dimensional posture of the flexible medium based on the input travel amount information while the position of the load center on the flexible-medium is perceived. As a result, it is possible to simulate the two-dimensional posture of the flexible medium in a case where the flexible medium is driven while a constituent component (i.e., a roller) of the transport mechanism comes in contact with the flexible medium, and to display the results of simulation on the display as a three-dimensional image. Accordingly, it is possible to three-dimensionally view and perceive the situation in which the flexible medium is transported by the constituent elements of the transport mechanism.

[12] At this time, when the flexible medium is a notebook-shaped medium (bankbook) consisting of a plurality of leaves, page numbers are assigned to respective leaves. By reference to a page number, a leaf, on which a load center present, is perceived along with the position of the load center on the leaf. As a result, it is possible to readily reproduce, on the display, the turning-over of all the leaves through by using constituent element of the transport mechanism.

[13] The position/posture computation section computes a three-dimensional transport position through use of a value which is formed by adding a predetermined error to the length of a predetermined portion of the three-dimensional transport path, thereby simulating deviation of the flexible-medium to be transported through the predetermined portion. At the time of real transport, the flexible medium may deviate from an ideal transport path or may be vibrated. However, the addition of the error amount mentioned above enables very easy simulation of deviation or vibration (oscillation). At this time, random deviation can be reflected in simulation of transport operation by means of random setting of the error amount in accordance with a predetermined statistical distribution.

[14] The position/posture computation section fixes a three-dimensional transport position at a predetermined position when the flexible medium has reached the predetermined position, or computes a three-dimensional transport position such that the transport speed of the flexible medium is reduced. As a result, occurrence of troubles in transport of the flexible medium at the predetermined position can be simulated. More specifically, troubles, such as jamming of the flexible medium for any reason or failure to transport the flexible medium stemming from slippage of the roller, can be simulated very easily. At this time, randomly-occurring troubles can be reflected in simulation of transport operation, by means of randomly setting the predetermined position in accordance with a predetermined statistical distribution.

[15] The thickness of the flexible medium is set beforehand as dimensional information. The simulation section simulates transport of the flexible medium in consideration of the thickness. As a result, it is possible to simulate the flexible medium even of a considerable thickness and to display its three-dimensional image. For instance, loading and stacking of paper sheets (flexible-medium) on, for example, a stacker of a copier can be reproduced on the display.

BRIEF DESCRIPTION OF THE DRAWINGS

FIG. 11 is an illustration showing an example of transport path to be set in the present embodiment;

FIGS. 12A and 12B are illustrations for describing deformation of a flexible medium when no constraints are imposed on the flexible medium;

FIGS. 13A and 13B are illustrations for describing deformation of a flexible medium when constraints are imposed on the flexible medium;

FIGS. 16A and 16B are illustrations for describing a timing at which a change arises in positional relationship between a flexible-medium and a roller (i.e., a flexible medium is released from a roller);

FIGS. 17A and 17B are illustrations for describing a timing at which a change arises in positional relationship between a flexible-medium and a roller (i.e., a flexible medium comes into contact with a roller);

FIGS. 22A, 22B, 23A, 23B, 24A, and 24B are illustrations for describing simulation of the turning-over of leaves of a notebook-shaped medium according to the present embodiment;

DESCRIPTION OF THE PREFERRED EMBODIMENTS

Preferred embodiments of the present invention will be described by reference to the accompanying drawings.

Figure 1:
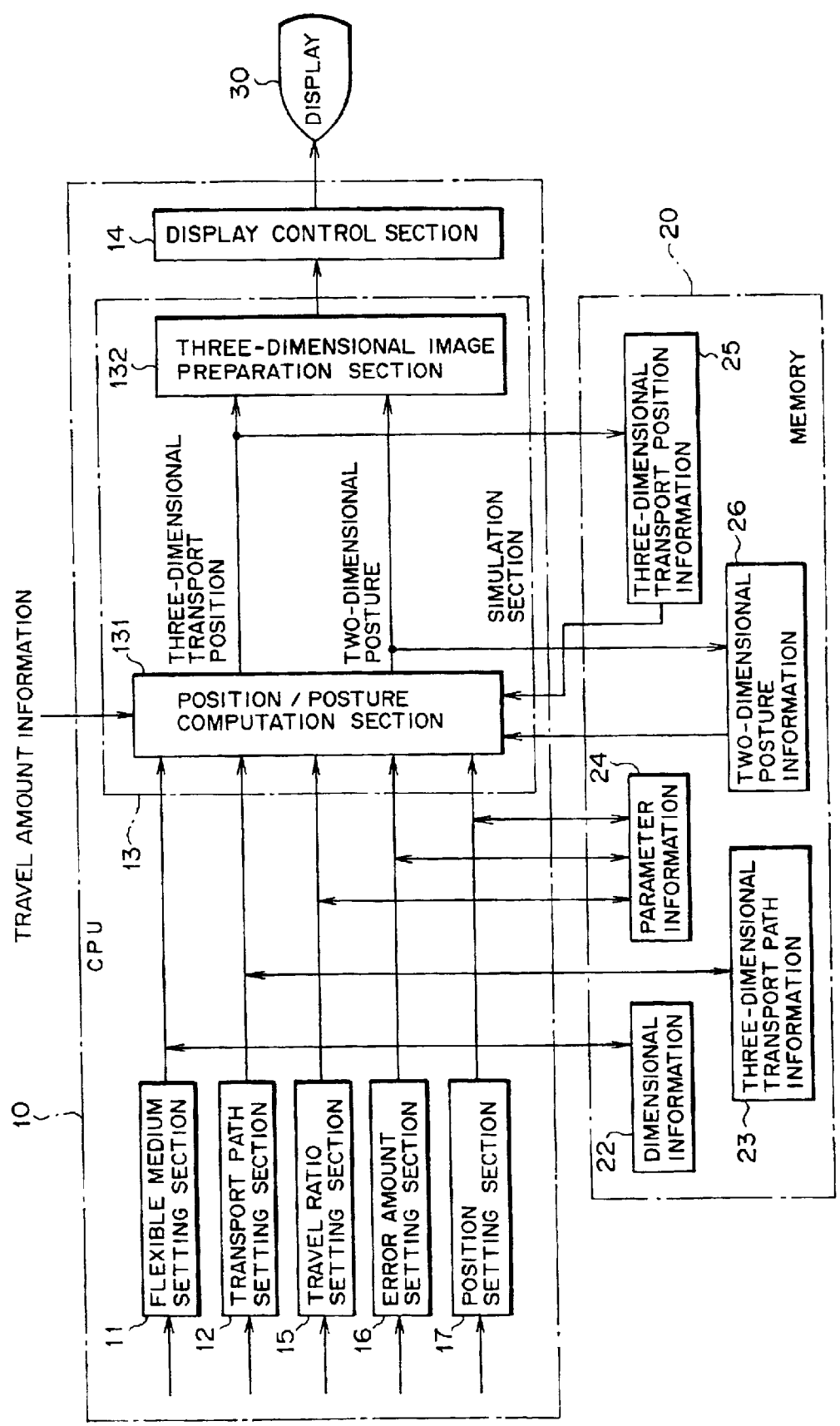
FIG. 1 is a block diagram showing a functional construction of a flexible medium transport simulation apparatus according to one embodiment of the present invention.
Figure 2:
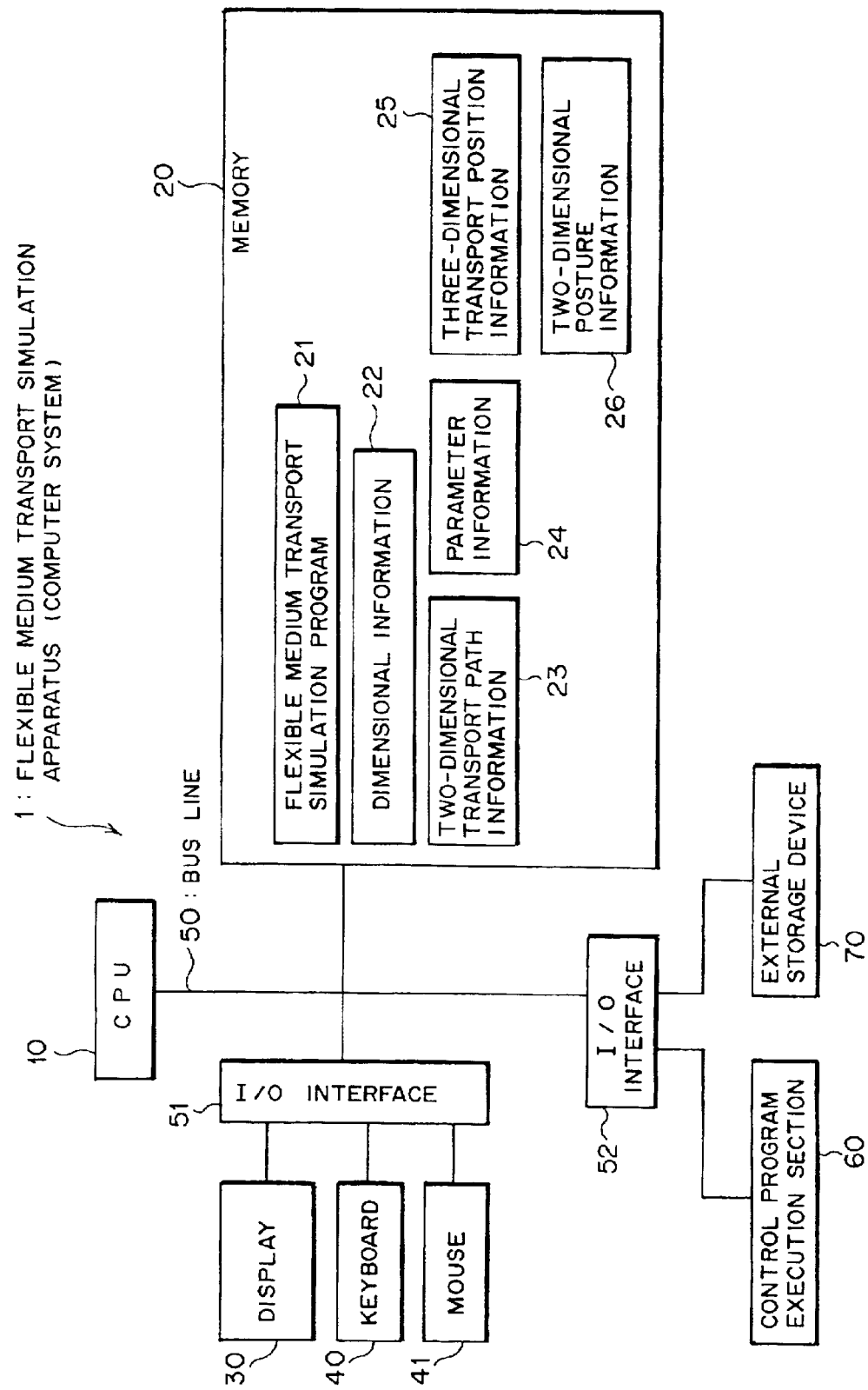
FIG. 2 is a block diagram showing hardware configuration of a computer system for implementing the flexible medium transport simulation apparatus according to the embodiment.

[1] Description concerning Construction of Flexible Medium Transport Simulation Apparatus according to an Embodiment:

FIG. 1 is a block diagram showing a functional construction of a flexible medium transport simulation apparatus according to one embodiment of the present invention. FIG. 2 is a block diagram showing hardware configuration of a computer system for implementing the flexible medium transport simulation apparatus according to the embodiment.

A computer system 1 (e.g., a personal computer) according to the embodiment shown in FIGS. 1 and 2 acts as an apparatus for effecting simulation and three-dimensional display of transportation of a flexible medium in a transport mechanism for transporting a sheet-like flexible medium.

Here, sheet-like mediums are, for example, paper, paper money, bankbooks, postcards, tickets, cards, and photographic films. A transport mechanism for transporting such flexible mediums is to be provided within, for example, a printer, a copier, a facsimile, or an ATM. In the present embodiment, the following description is of a case where a paper sheet (designated by reference numeral 100 shown in FIG. 20A) or a bankbook (or a book-like medium, designated by reference numeral 200 shown in FIGS. 21A and 21B) is transported as a flexible medium.

As shown in FIG. 2, the computer system i is provided with a CPU 10 and a bus line 50 connected to the CPU 10. The bus line 50 is connected to a display (e.g., a CRT, an LCD, or a PDP) 30, a keyboard 40, and a mouse 41 via an I/O interface 51, as well as to a memory (ROM or RAM) 20. Further, the bus line 50 may be connected to a control program execution section 60 and an external storage device 70 via an I/O interface 52.

Here, an application program (i.e., a flexible medium transport simulation program) to be described later is stored in the memory 20 (or the external storage device 70). The memory 20 also acts as working memory to be used when the CPU 10 simulates transportation of a flexible medium. To this end, the memory 20 stores dimensional information (size information) 22, three-dimensional transport path information 23, parameter information 24, three-dimensional transport position information 25, and two-dimensional posture information 26, which will be described later.

A display status of the display 30 is controlled by the CPU 10 (by means of the function of a display control section 14 to be described later), and displays the result of simulation performed by the CPU 10 (i.e., the function of a simulation section 13 to be described later) as transportation of a flexible medium.

The keyboard 40 and the mouse (or pointing device) 41 are to be operated by an operator (or user) who views a screen on the display 30, whereby instructions or various types of information pieces are input to the CPU 10 (or the computer system 1). In the present embodiment, the keyboard 40 and the mouse 41 act as a travel amount information input section for entering travel amount information about the amount of travel of a flexible medium.

In a case where the keyboard 40 is used as a travel amount information input section, numerals representing a command or the amount of travel are input to the CPU 10 (or the simulation section 13 to be described later) as travel amount information by way of the keyboard 40.

In a case where the mouse 41 is used as a travel amount information input section, the extent and direction to and in which a three-dimensional image is operated or the extent and direction to and in which a constituent component image is operated are input to the CPU 10 (or the simulation section 13 to be described later) as travel amount information, by means of dragging, through use of the mouse 41, a three-dimensional image of a flexible medium or a constituent component image of a transport mechanism acting on a flexible medium (e.g. a roller image), which is displayed on the display 30.

The control program execution section 60 executes a control program for controlling the operation of a transport mechanism which is a subject of simulation (or an apparatus equipped with the transport mechanism), computes a controlled variable of a constituent component (e.g., a roller) which acts on a flexible medium, and outputs the thus-computed controlled variable. In a case where the control program is verified, the previously-described control program execution section 60 is connected to the simulation apparatus 1 according to the present embodiment as a travel amount information input section. A controlled variable output from the control program execution section 60 is input to the CPU 10 (or the simulation section 13 to be described later) as travel amount information.

The memory 20 stores an application program (i.e., a flexible medium transport simulation program) 21 for implementing the function of a flexible medium setting section 11, that of a transport path setting section 12, that of a simulation section 13 (including a position/posture computation section 131 and a three-dimensional image preparation section 132), that of a display control section 14, that of a travel ratio setting section 15, that of an error amount setting section 16, and that of a position setting section 17, all of which are shown in FIG. 1.

As the CPU 10 reads and executes the application program 21 from the memory 20 by way of the bus line 50, there are implemented the function of the flexible medium setting section 11, that of the transport path setting section 12, that of the simulation section 13, that of the display control section 14, that of the travel ratio setting section 15, and those of the error amount setting section 16 and the position setting section 17 (which will be described in detail later); that is, the function of the flexible medium transport simulation apparatus.

The application program 21 is provided as being recorded on a computer-readable recording medium; for example, a flexible disk or a CD-ROM. The computer system 1 reads the program 21 from the recording medium and transfers the thus-read program 21 to an internal storage device (i.e., the memory 20) or the external storage medium 70. Alternatively, the program 21 may be recorded on a storage device (or a recording medium); e.g., a magnetic disk, an optical disk, or a magneto-optical disk, and supplied to the computer system 1 from the storage device via a communications channel.

At the time of implementation of the function of the flexible medium setting section 11, that of the transport path setting section 12, that of the simulation section 13, that of the display control section 14, that of the travel ratio setting section 15, that of the error amount setting section 16, and that of the position setting section 17, the program 21 stored in the internal storage device (i.e., the memory 20 in the present embodiment) is executed by a microprocessor of the computer (i.e., the CPU 10 according to the present embodiment). At this time, the computer system 1 may directly read and execute the program 21 recorded on the recording medium.

In the present embodiment, a computer is a concept comprehensively including hardware and an operating system and signifies hardware which operates under control of the operating system. In a case where hardware does not need any operating system and can be operated through use of only an application program, the hardware per se corresponds to a computer. The hardware comprises at least a microprocessor, such as a CPU, and a computer program recorded on a recording medium.

The application program 21 includes a program code for causing such a computer (or the computer system 1) to implement the function of the flexible medium setting section 11, that of the transport path setting section 12, that of the simulation section 13, that of the display control section 14, that of the travel ratio setting section 15, that of the error amount setting section 16, and that of the position setting section 17. Portions of those functions may be implemented by an operating system rather than by the application program 21.

In addition to the flexible disk, the CD-ROM, a DVD, the magnetic disk, the optical disk, and the magneto-optical disk set forth, there can be utilized computer-readable various mediums, such as an IC card, a ROM card, a magnetic tape, a punch card, an internal storage device (memory such as RAM or ROM) provided in a computer, an external storage device, or printed matter having a bar code printed thereon.

There will now be described in detail various functions to be implemented by the CPU 10 (i.e., the function of the flexible medium setting section 11, that of the transport path setting section 12, that of the simulation section 13, that of the display control section 14, that of the travel ratio setting section 15, that of the error amount setting section 16, and that of the position setting section 17).

As dimensional information about a flexible medium, the flexible medium setting section 11 sets beforehand the length L of the flexible medium with reference to a transport direction (see FIG. 20A), the width W of the same with reference to a widthwise direction (i.e., a depthwise direction of the transport mechanism) perpendicular to the transport direction within a transport plane, and the thickness "t" of the same (not shown). In reality, values about L, W, and "t" entered from the outside by use of the keyboard 40 are written into the memory 20 as dimensional information 22 or output to the simulation section 13.

The transport path setting section 12 sets beforehand a path along which a flexible medium is to be transported within the transport mechanism (designated by reference numeral 300 shown in FIG. 11), as a three-dimensional transport path including a shift in the widthwise direction. In reality, information about a three-dimensional transport path entered from the outside is written into the memory 20 or output to the simulation section 13 as three-dimensional transport path information 23.

At this time, the transport path setting section 12 sets a three-dimensional transport path through use of circular arcs and straight lines for simplifying computing operation to be performed by the simulation section 13.

Here, the "shift toward the widthwise direction" is set beforehand in consideration of horizontal deviation of a flexible medium; that is, skewing of a flexible medium.

FIG. 11 shows an example of a transport path 300 set in the present embodiment. Circles provided in FIG. 11 depict rollers which are constituent components of the transport mechanism. As shown in FIG. 11, the transport mechanism which is the subject of simulation in the present embodiment has rollers which transport a flexible medium while remaining in contact therewith, serving as constituent components.

The travel ratio setting section 15 sets a travel ratio P which is the rate of the amount of travel of a flexible medium to a single rotation of the rollers. The value of a desired travel ratio P which has been entered from the outside by use of the keyboard 40 is written into the memory 20 as parameter information 24, or a travel ratio P is automatically generated and output to the simulation section 13. In a case where the travel ratio setting section 15 automatically produces a travel ratio P, the travel ratio setting section 15 randomly produces the travel ratio P in accordance with a predetermined statistical distribution (e.g., a Gaussian distribution shown in FIG. 32).

The error amount setting section 16 sets a predetermined error amount "e." The value of a desired error amount "e" which has been entered from the outside by use of the keyboard 40 is written into the memory 20 as parameter information 24, or an error amount "e" is automatically produced and output to the simulation section 13. In a case where the error amount setting section 16 automatically produces an error amount "e," the error amount setting section 16 randomly produces the error amount "e" in accordance with a predetermined statistical distribution (e.g., a Gaussian distribution, or normal distribution, shown in FIG. 32). The predetermined error amount "e" is added to a path length D of a predetermined section of a three-dimensional transport path set by the transport path setting section 12 for simulating the deviation of a flexible medium in the manner as will be described later.

The position setting section 17 sets a position (predetermined position) at which troubles have arisen. A desired position—at which troubles have arisen and which is entered from the outside by use of the keyboard 40—is written into the memory 20 as parameter information 24. Alternatively, a position at which troubles have arisen is automatically produced and output to the simulation section 13. In a case where the position setting section 17 automatically produces a position where troubles have arisen, the position setting section 17 randomly produces a position at which troubles have arisen, in accordance with a predetermined statistical distribution (e.g., a Gaussian distribution shown in FIG. 32). The position where troubles have arisen is specified as a position where anomalous transport of a flexible medium (e.g., paper jamming or roller sliding) will arise at the time of simulation of transportation.

The simulation section 13 is constructed in the CPU 10 while a transport mechanism is taken as a three-dimensional mechanism model and simulates transportation of a flexible medium to be performed by the transport mechanism. At this time, the information input from the flexible medium setting section 11, the transport path setting section 12, the travel ratio setting section 15, the error amount setting section 16, and the position setting section 17, or the dimensional information 22 read from the memory 20, the three-dimensional transport path information 23, and the parameter information 24 are employed. Further, if necessary, the three-dimensional transport position information 25, which is the result of previous simulation, and two-dimensional posture information 25 are read from the memory 20 and taken into consideration.

The simulation section 13 has functions of serving as the position/posture computation section 131 and the three-dimensional image preparation section 132.

The position/posture computation section 131 computes a three-dimensional transport position of a flexible medium along the three-dimensional transport path and also computes a two-dimensional posture of the flexible medium in a plane perpendicular to the widthwise direction, on the basis of the dimensional information 22, the three-dimensional transport path information 23, the parameter information 24, and the travel amount information entered by way of the mouse 41 or the control program execution section 60. At this time, the position/posture computation section 131 computes a three-dimensional transport position corresponding to travel amount information as a current deviation of the flexible medium from the three-dimensional transport position (represented by information 25 stored in the memory 20) and computes a two-dimensional posture corresponding to travel amount information as a current deviation of the flexible medium from the two-dimensional posture (represented by information 26 stored in the memory 20).

The three-dimensional image preparation section 132 prepares a three-dimensional image of the flexible medium on the basis of the three-dimensional transport position or the two-dimensional posture computed by the position/posture computation section 131 and the dimensional information 22, and outputs the three-dimensional image as the result of simulation.

At this time, the three-dimensional image preparation section 132 readily prepares a three-dimensional image of a flexible medium, by means of uniformly imparting a widthwise length (i.e., depth) W included in the dimensional information 22 to the two-dimensional posture of the flexible medium. Further, the three-dimensional image preparation section 132 readily prepares a three-dimensional image of the flexible medium taking into consideration the thickness "t," by means of uniformly imparting a thickness "t" included in the dimensional information 22 to the two-dimensional posture of the flexible medium.

Figure 20A:
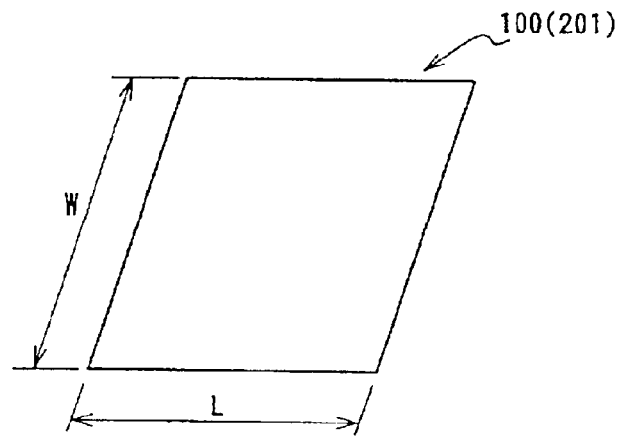
FIGS. 20A through 20C are schematic perspective views for describing a model of a flexible medium according to the present embodiment.
Figure 20B:
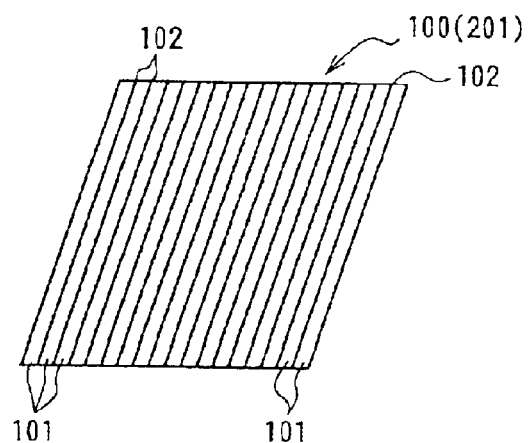
Figure 20C:
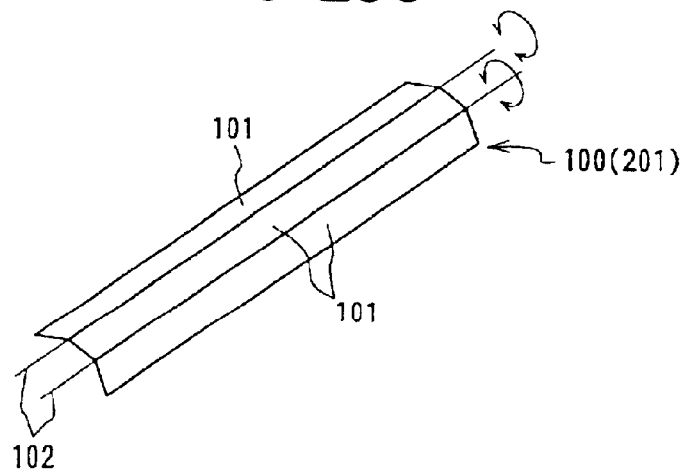

Here, the simulation section 13 handles paper sheet 100 (i.e., a flexible medium) shown in FIG. 20A as a three-dimensional model formed by means of joining together a plurality of strip-shaped members 101 so as to be rotatable about a rotation axis 102 parallel to the widthwise direction (see section [2-6] provided below). FIGS. 20A through 20C are schematic perspective views for describing a model of the paper sheet 100 (flexible medium) according to the present embodiment.

The position/posture computation section 131 computes a three-dimensional transport position and two-dimensional posture of a flexible medium through use of the following functions (i) through (vi), thereby simulating transportation of a flexible medium.

(i) The position/posture computation section 131 computes a two-dimensional posture through use of circular arcs and straight lines by means of approximation for facilitating computing operation. The computation will be described hereafter in more detail by reference to FIGS. 13 and 14 (see section [2-3] provided below)

(ii) Upon receipt of travel amount information while a load center of the force applied for putting a flexible medium in motion is fixed on the flexible medium, the position/posture computation section 131 computes a two-dimensional posture on the basis of the position of the fixed, or stationary, load center on the flexible medium, as well as on the basis of the travel amount information. Computation of a two-dimensional posture will be described in detail later by reference to FIG. 5 and FIGS. 12A through 13B (see section [2-3] provided below).

Figure 21A:
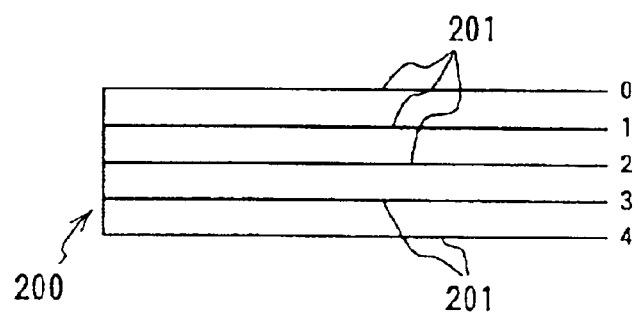
FIGS. 21A and 21B are illustrations for describing definitions of variables pertaining to pages of a notebook-shaped medium according to the present embodiment.
Figure 21B:
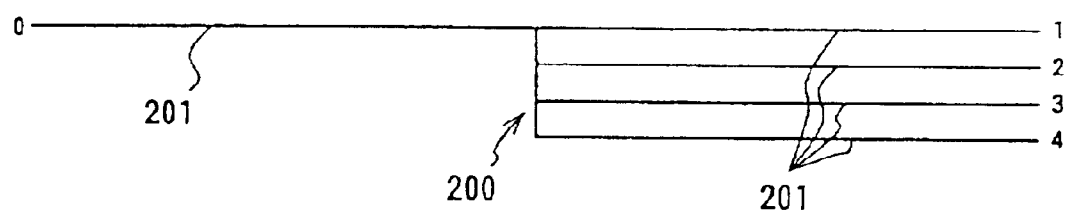

As shown in FIGS. 21A and 21B, in a case where the flexible medium is a bankbook consisting of a plurality of leaves 201 (i.e., a notebook-shaped medium), position of the stationary load center is limited on an externally-exposed page of the bankbook 200 (see section [2-5] provided below).

(iii) In a case where the travel amount information is input such that the load center of the force applied for putting the flexible medium in motion is shifted on the flexible medium, the position/posture computation section 131 computes a two-dimensional posture on the basis of the travel amount information while the shifting load center on the flexible medium is ascertained. Computation of a two-dimensional posture will be described in detail later by reference to FIG. 6 and FIGS. 16A through 19B (see section [2-4] provided below).

In a case where a flexible medium is the above-described bankbook 200, page numbers 0 through 4 assigned to the leaves 201 have been defined in advance. On the basis of the page number, the page on which load center is located is recognized, and the position of the load center on the page is also perceived. As a result, the turning-over of the bankbook 200 is simulated. Turning-over operation will be described later in more detail by reference to FIGS. 7 through 10 and FIGS. 22A through 25C (see section [2-5] provided below). FIGS. 21A and 21B are drawings for illustrating the definition of variables pertaining the respective leaves 201 of the bankbook (i.e., a notebook-shaped medium) 200 according to the present embodiment.

(iv) The position/posture computation section 131 computes a three-dimensional transport position and two-dimensional posture of a flexible-medium, on the basis of the travel ratio P set by the travel ratio setting section 15, thus simulating transportation of the flexible medium. Simulation of transportation of a flexible medium will be described later in more detail by reference to FIG. 31 (see heading [2-10] provided below).

(v) The position/posture computation section 131 computes a three-dimensional transport position through use of a value, which value is determined by adding the error amount "e" set by the error amount setting section 16 to the path length "D" of a predetermined portion of the three-dimensional transport path set by the transport path setting section 12. Thus, the deviation of the flexible medium which is transported over the predetermined portion is simulated. Simulation of deviation of a flexible medium will be described later in more detail by reference to FIGS. 26A through 27B (see section [2-8]).

(vi) The position/posture computation section 131 simulates occurrence of anomalous transport of a flexible medium at a predetermined position, by means of securing the three-dimensional transport position to a predetermined position set by the position setting section 17 (i.e., a position at which troubles will arise) at a point in time when the flexible medium has arrived at the predetermined position, or by means of computing the three-dimensional transport position such that the transport speed of the flexible medium is decreased. Simulation of anomalous transport will be described later in more detail by reference to FIGS. 28A through 30 (see section [2-9] provided below).

The display control section 14 indicates the result of simulation performed by the simulation section 13 (i.e., the three-dimensional transport position and two-dimensional posture of a flexible medium) on the display 30 as transportation of the flexible medium.

[2] Description concerning Operation of the Flexible Medium Transport Simulation Apparatus 1 according to the Present Embodiment:

[2-1] Description concerning Overall Flow of Simulation Processing:

According to the flowchart (steps S1 through S8) shown in FIG. 3, the overall flow of simulation processing to be performed by the flexible medium transport simulation apparatus 1 according to the present embodiment will be described.

Prior to commencement of simulation processing, the dimensional information 22, the three-dimensional transport path information 23, and the parameter information 24 (i.e., a travel ratio P, an error amount "e", and a position at which troubles have arisen) are set in the memory 20, by means of the information input from the flexible-medium setting section 11, the transport path setting section 12, the travel ratio setting section 15, the error amount setting section 16, and the position setting section 17. At this time, the positions of constituent components constituting the transport mechanism (e.g., rollers acting on a flexible medium) as well as the three-dimensional transport path are set in the three-dimensional transport path information 23.

Figure 3:
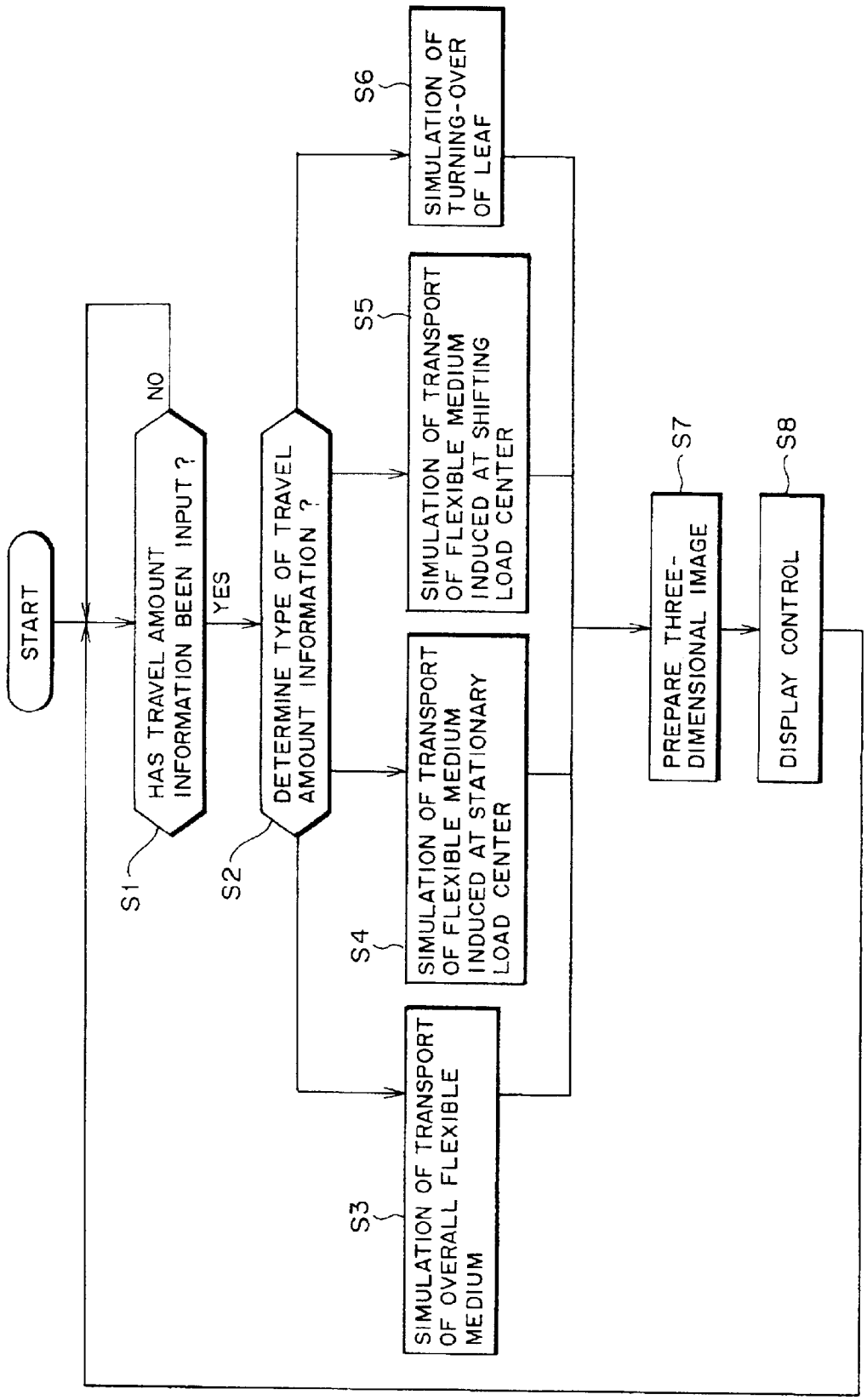
FIG. 3 is a flowchart for describing the overall flow of simulation processing to be performed by the flexible medium transport simulation apparatus according to the present embodiment.

As shown in FIG. 3, the CPU 10 (i.e., the simulation section 13) discriminates whether or not travel amount information has been input through either one of the mouse 41 and the control program execution section 60 (step S1). When the travel amount information is input (YES is selected in step S1), a determination is made as to which one of the following four types of the input travel amount information belongs to: (1) travel of the entire flexible medium as a unit, (2) travel of the flexible medium induced with a stationary load center, (3) travel of the flexible medium induced with a shifting load center, and (4) the turning-over of pages of a notebook-shaped medium (step S2).

In a case where the travel amount information is determined to relate to (1) travel of the entire flexible medium as a unit, the CPU 10 (i.e., the position/posture computation section 131) executes travel simulation processing pertaining to the overall flexible medium (step S4, and see section [2—2] provided below), in accordance with the flowchart shown in FIG. 4 (steps S11 through S13).

Figure 6:
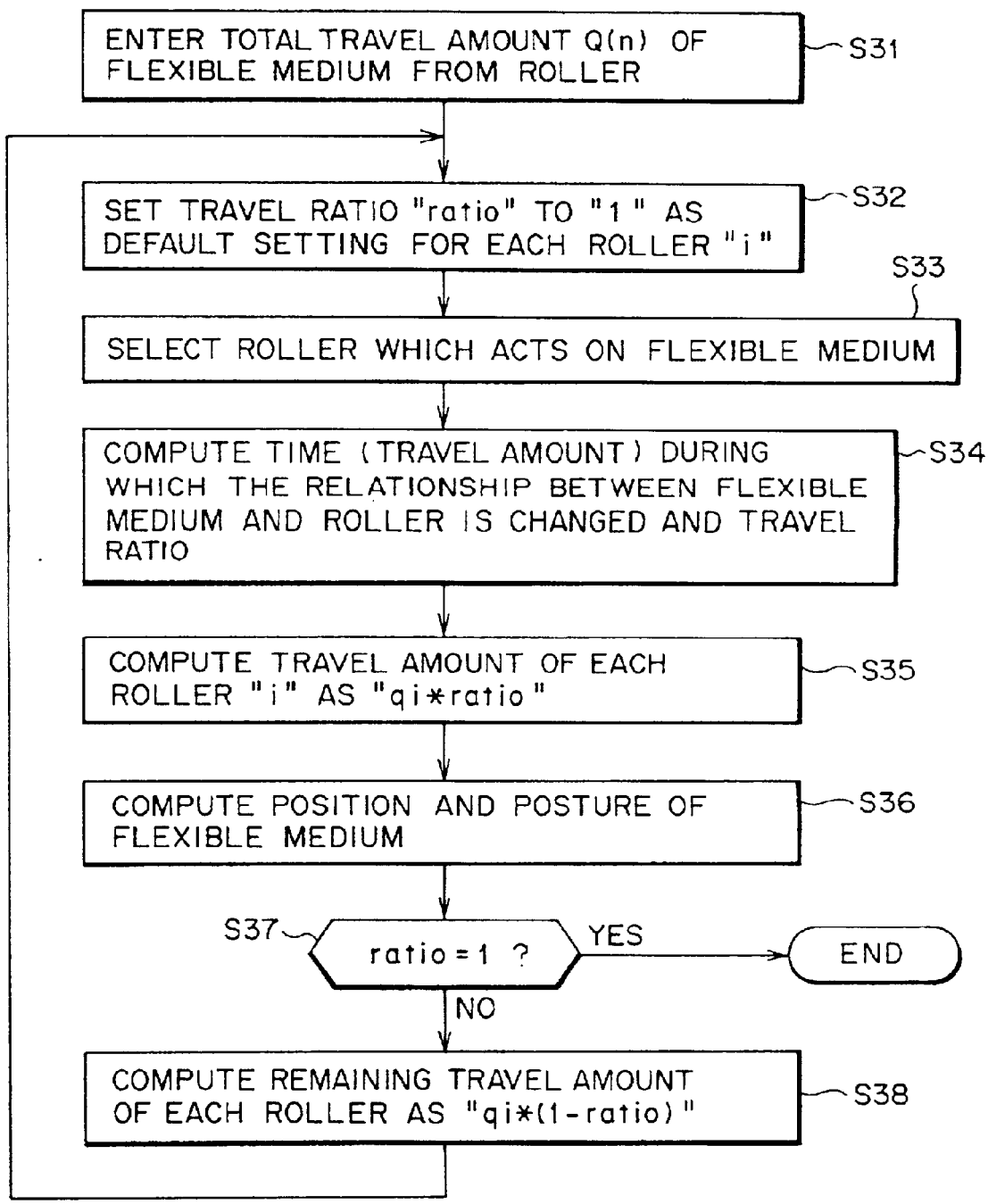
FIG. 6 is a flowchart for describing simulation of transport of a flexible medium to be effected at a shifting load center in the flexible medium transport simulation apparatus according to the present embodiment.

When the travel amount information is determined to relate to (2) travel of a flexible medium induced with a stationary load center, the CPU 10 (i.e., the position/posture computation section 131) performs travel simulation processing of a flexible medium which would be induced with a stationary load center (step S4, and see section [2-3]), in accordance with the flowchart shown in FIG. 6 (steps S31 through S38).

When the travel amount information is determined to relate to (3) travel of a flexible medium induced with a shifting load center, the CPU 10 (i.e., the position/posture computation section 131) performs travel simulation processing of a flexible medium which would be induced with a shifting load center (step S5, and see section [2-4]), in accordance with the flowchart shown in FIG. 6 (steps S31 through S38).

When the travel amount information is determined to relate to the turning-over of pages of a notebook-shaped medium, the CPU 10 (i.e., the position/posture computation section 131) performs simulation of the turning-over of pages of a notebook-shaped medium (step S6, and see section [2-5]), in accordance with the flowchart shown in FIGS. 7 through 10 (steps S31' through S36', S41 through S58, and S61 through S72).

When simulation processing is completed in any one of steps S3 through S6, the CPU 10 (i.e., the three-dimensional image preparation section 132) prepares a three-dimensional image of a flexible medium located at the three-dimensional transport position, or a three-dimensional image of the flexible medium having the two-dimensional posture, on the basis of the three-dimensional transport position and the two-dimensional posture (step S7).

The CPU 10 (i.e., the display control section 14) controls a display status of the display 30 such that the three-dimensional image prepared by the three-dimensional image preparation section 132 appears on the display 30 (step S8). As a result, the three-dimensional image of the flexible medium is displayed in the manner as shown in, e.g., FIGS. 25A through 25C. The examples shown in FIGS. 25A through 25C correspond to the simulation result of the turning-over of pages of the notebook-shaped medium, and details of the display will be described in detail later.

After display control operation, the CPU 10 (i.e., the simulation section 13) returns to step S1, where the CPU 10 awaits input of travel amount information.

Simulation processing pertaining to respective steps S3 through S6 will be described in detail by reference to FIGS. 12A through 19B and FIGS. 21A through 25C and in accordance with flowcharts shown in FIGS. 4 through 10. Further, other functions of the simulation section 13 according to the present invention will be described with reference to FIGS. 11 and 20A through 20C and FIGS. 26A through 32.

In the following description, the position and posture of a flexible medium will be described in a two-dimensional plane. Motions of most of the transport mechanisms can be expressed on a two-dimensional plane.

Figure 4:
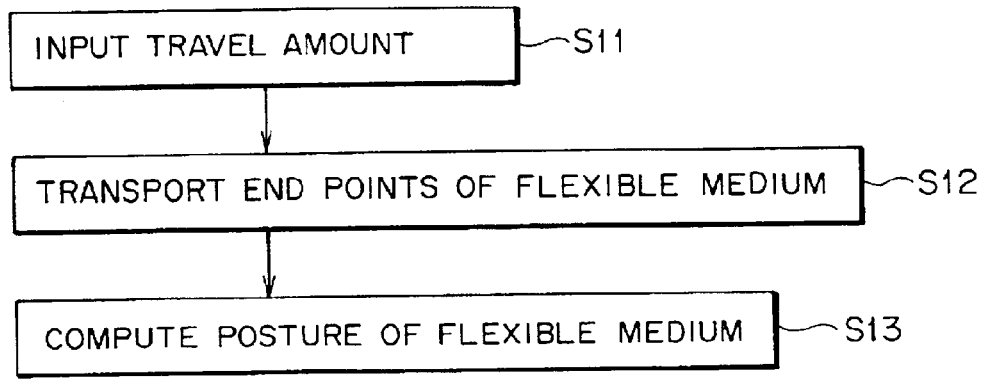
FIG. 4 is a flowchart for describing simulation of transport of an overall flexible medium to be performed by the flexible medium transport simulation apparatus according to the present embodiment.

[2—2] Description concerning Travel Simulation of the Overall Flexible Medium as a Unit:

When the travel amount information is determined to relate to the travel of the overall flexible medium as a unit, the simulation of travel of the overall flexible medium is performed in accordance with procedures shown in the flowchart shown in FIG. 4 (i.e., steps S11 to S13).

As mentioned previously, prior to commencement of simulation processing, the three-dimensional transport path of the flexible medium is set in advance in the memory 20 as the three-dimensional transport path information 23. The three-dimensional transport path includes a shift in a widthwise direction. As shown in FIG. 11, the three-dimensional transport path is essentially prepared and set by combination of straight lines and circular arcs on a two-dimensional plane.

Upon receipt of the amount of travel of the overall flexible medium resulting from a moving operation (step S11), the position/posture computation section 131 moves current respective ends (i.e., the positions of the ends) of the flexible medium along the three-dimensional transport path by means of only the received amount of travel, thereby determining new positions of the respective ends (step S12).

As a result, the position of the flexible medium is determined, and hence a range in which the flexible medium is to be present is then determined on the three-dimensional transport path. On the basis of the posture of the three-dimensional transport path in that range, the posture of the flexible medium is computed and determined (step S13). At this time, since the three-dimensional transport path is set by combination of straight lines and circular arcs, as mentioned previously, the posture of the flexible medium is also expressed by combination of straight lines and circular arcs.

Figure 5:
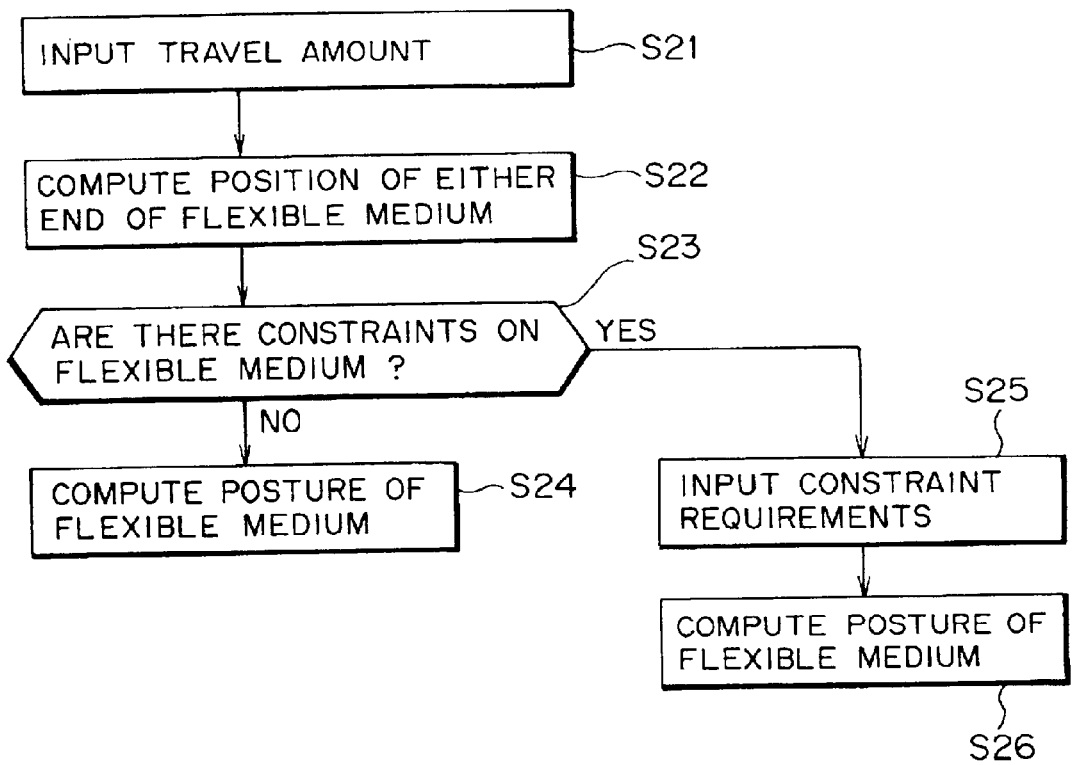
FIG. 5 is a flowchart for describing simulation of transport of a flexible medium to be effected at a stationary load center in the flexible medium transport simulation apparatus according to the present embodiment.

[2-3] Description concerning Simulation of Travel of Flexible Medium Induced with Stationary Load Center:

When travel amount information is determined to relate to (2) travel of the flexible medium induced with a stationary load center, simulation of travel of the flexible medium induced with the stationary load center is effected in accordance with procedures provided in the flowchart (i.e., steps S21 through S26) shown in FIG. 5. Procedures will be described by reference to FIGS. 12A through 15.

Figure 14:
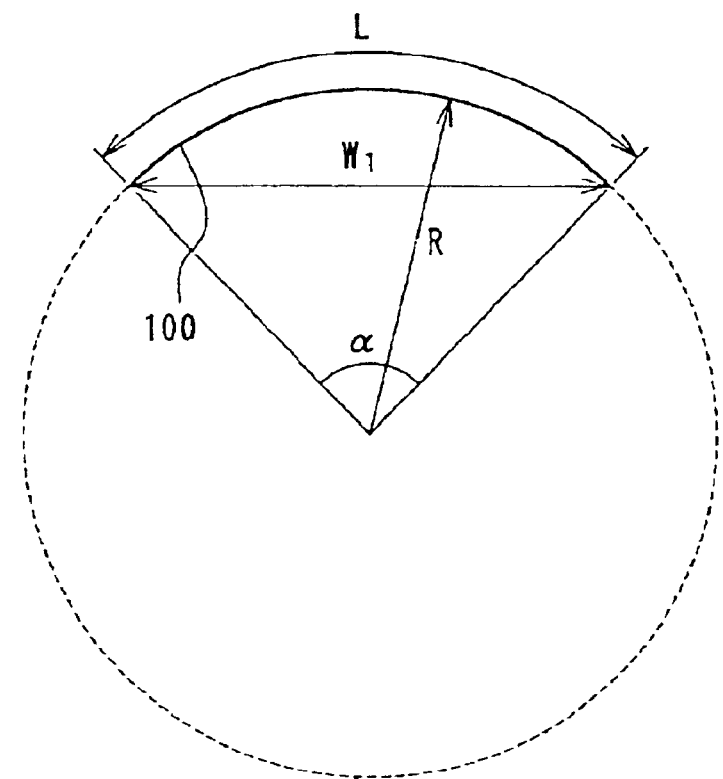
FIG. 14 is an illustration for describing a method of approximating the posture of a flexible medium when no constraints are imposed on the flexible medium.
Figure 15:
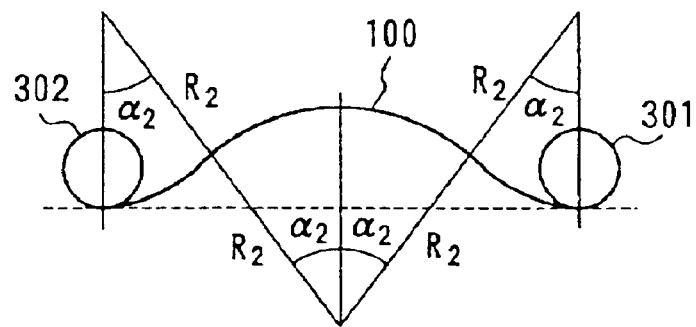
FIG. 15 is an illustration for describing a method of approximating the posture of a flexible medium when constraints are imposed on the flexible medium.

FIGS. 12A and 12B are drawings for describing a modification of the flexible medium 100 without constraints; FIGS. 13A and 13B are drawings for describing another modification of the flexible medium 100 with constraints; FIG. 14 is a drawing for describing a method of approximating the posture of the flexible medium 100 without constraints according to the present embodiment; and FIG. 15 is a drawing for describing a method of approximating the flexible medium 100 with constraints according to the present embodiment.

Entry of travel amount information about the flexible medium 100 with load centers being stationary is effected, by means of specifying desired points (i.e., stationary load centers) on the three-dimensional image of the flexible medium displayed on the display 30 through use of, e.g., the mouse 41, and specifying and inputting the amount of travel (i.e., the amount of deviation) and a traveling direction with regard to the desired points.

As shown in FIGS. 12A through 13B, the following descriptions explain a case where one or both of the ends of the flexible medium 100 are specified as stationary load centers and where the amounts of travel (based on the assumption that the traveling direction is along the three-dimensional transport path) of respective stationary load centers are input as travel amount information.

FIGS. 12A and 12B show an example in which the amount of travel is input such that distance L shown in FIG. 12A between the respective ends of the flexible medium (e.g., paper sheet) 100 without constraints is reduced to $W_1$ (<L) shown in FIG. 12B. FIGS. 13A and 13B show an example in which the amount of travel is input such that an inter-roller-length (i.e., the length of a portion of the flexible medium 100 between the rollers 301 and 302) of the flexible medium (paper sheet) 100 with constraints of two rollers 301 and 302 changes from $W_2$, which is equal to the distance between the rollers 301 and 302 as shown in FIG. 13A, to $L_2$ (>$W_2$) shown in FIG. 13B.

Upon receipt of the amount of travel of the flexible medium 100 induced with the stationary load center(s) (at respective ends or one end) in the manner as mentioned previously (step S21), the position/posture computation section 131 computes the positions of respective ends of the flexible medium 100 after movement, on the basis of the amount of travel and the current position of the flexible medium 100 (i.e., the three-dimensional transport position information 25 stored in the memory 20) (step S22). At this time, if an attempt is made to move the respective ends of the paper sheet 100 to an extent greater than the dimension of the paper sheet 100 (i.e., the length L of the paper sheet 100 in the transporting direction), an operation for inputting such an amount of travel is disregarded.

The position/posture computation section 131 checks whether or not there are constraints to the position on the transport path at which the flexible medium 100 is currently located (i.e., the three-dimensional transport position information 25) (step S23).

Presence/absence of constraints corresponds to presence/absence of an element which affects the posture of the flexible medium 100 by posing interference to the flexible medium 100 (e.g., a roller which is one of components constituting the transport mechanism). As mentioned previously, FIGS. 13A and 13B show an example in which constraints are imposed on deformation of a portion of the flexible medium by the two rollers; that is, a case where rollers impose constraints on the flexible medium 100.

In a case where no constraints are imposed on the flexible medium 100, as shown in FIGS. 12A and 12B (i.e., NO is selected in step S23), the position/posture computation section 131 computes a two-dimensional posture of the flexible medium 100 on the basis of the length L of the flexible medium 100 and distance $W_1$ between the respective ends of the flexible medium 100 after movement (step S24). Computation of a two-dimensional posture is performed approximately by means of a method to be described by reference to FIG. 14.

In a case where constraints are imposed on the flexible medium 100 as shown in FIGS. 13A and 13B (YES is selected in step S23), the position/posture computation section 131 receives information about the constraints (step S25). Subsequently, on the basis of the interval between the constraints imposed on the flexible-medium 100; that is, distance $W_2$ between rollers, and length $L_2$ of the flexible medium 100 located between the rollers (i.e., the length of paper), the two-dimensional posture of the flexible medium 100 is computed (step S26). Computation of a two-dimensional posture is effected by means of an approximation method to be described by reference to FIG. 15.

Various posture computation methods are employed in the position/posture computation section 131.

For instance, the relationship between L, $W_1$, and the posture pattern of the flexible medium 100 or the relationship between $W_2$, $L_2$, and the posture pattern of the actual flexible medium 100 is registered as a table in advance. With no constraints imposed on the flexible medium 100, a posture pattern is retrieved from the table while length L obtained as the dimension information 22 and distance $W_1$ (=L−the mount of travel) between the respective ends of the flexible medium 100 computed on the basis of the input amount of travel are taken as keys. Otherwise with any constraints imposed on the flexible medium, a posture pattern is retrieved from the table, using, as keys, the inter-roller distance $W_2$ obtained as the three-dimensional transport path information 23 and also the length $L_2$ (=$W_2$+ the amount of travel) of the paper sheet computed from the input amount of travel.

In addition to the method of acquiring a posture pattern through retrieval of the table in the manner as mentioned above, there are a method of determining the posture of the flexible medium 100 through computation of buckling based on strength of materials and a posture approximation method for readily describing or computing the posture of the flexible medium 100 through use of circular arcs and straight lines. The present embodiment employs the posture approximation method, and the method will be described by reference to FIGS. 14 and 15.

Analysis of a transport mechanism usually does not require consideration of the accurate posture of the flexible medium 100; simple and approximate description of posture of the flexible medium 100 through use of circular arcs is sufficient.

In a case where there are no constraints, a curve representing the two-dimensional posture of the flexible medium 100 is made analogous to a circular arc such as that shown in FIG. 14. The radius R and angle "$\alpha$" of the circular arc are computed from L and $W_1$ stated previously. A relationship expressed by (1) provided below stands between $W_1$, R, and "$\alpha$," and relationship expressed by (2) provided below stands between L, R, and "$\alpha$". The radius R and angle "$\alpha$" of the circular arc can be very readily computed from the relationships expressed by (1) and (2).

$$W_1 = 2 * R * \sin(\alpha/2) \quad (1)$$

$$L = R * \alpha \quad (2)$$

In contrast, in a case where there are constraints, a curve representing the two-dimensional posture of the flexible medium 100 located between the two rollers 301 and 302 can be made analogous to four circular arcs in the manner as shown in FIG. 15. Each of the four circular arcs has a radius $R_2$ and an angle "$\alpha_2$." A relationship expressed by (3) provided below stands between $W_2$, $R_2$, and "$\alpha_2$," and a relationship expressed by (4) provided below stands between $L_2$, $R_2$, and "$\alpha_2$." The radius $R_2$ and angle "$\alpha_2$" of each of the circular arcs can be very readily computed from the relationships expressed by (3) and (4).

$$W_2/4 = R_2 * \sin(\alpha_2) \quad (3)$$

$$L_2/4 = R_2 * \alpha_2 \quad (4)$$

[2-4] Description concerning simulation of travel of the flexible medium induced with a shifting load center:

When the travel amount information is determined to relate to (3) travel of the flexible medium induced with a shifting load center, simulation of travel of the flexible medium induced with the shifting load center is effected in accordance with procedures provided in the flowchart (i.e., steps S31 through S38) shown in FIG. 6. Procedures will be described by reference to FIGS. 16A through 19B.

Figure 18A:
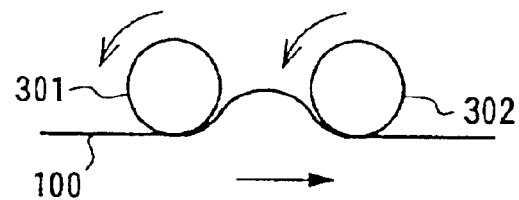
FIGS. 18A and 18B are illustrations for describing a timing at which a change arises in positional relationship between a flexible-medium and rollers (i.e., a slack in a flexible medium located between rollers disappears)
Figure 18B:
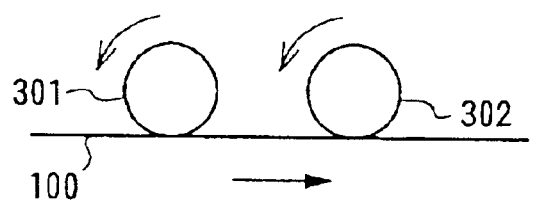
Figure 19A:
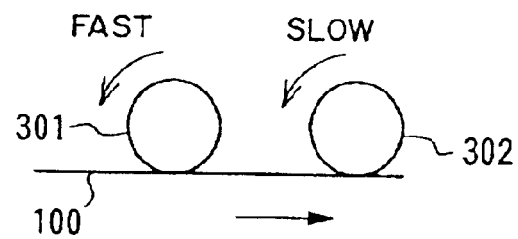
FIGS. 19A and 19B are illustrations for describing a situation in which a difference in speed between two rollers induces a slack in the flexible medium being transported.
Figure 19B:
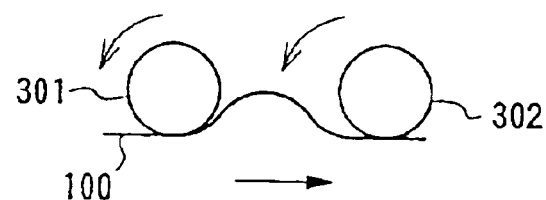

FIGS. 16A through 18B are illustrations for describing a timing at which the positional relationship between the flexible medium 100 and the two rollers 301 and 302 is changed. FIGS. 16A and 16B show an example of timing at which the flexible medium 100 is released form the roller 302. FIGS. 17A and 17B show an example of timing at which the flexible medium 100 comes into contact with the roller 302. FIGS. 18A and 18B show an example of timing at which a slack of the flexible medium 100 situated between the rollers 301 and 302 disappears. FIGS. 19A and 19B show an example of timing at which a slack arises in the flexible medium 100 being transported, for reasons of a difference in rotating speeds of the two rollers 301 and 302.

In a state in which the position of the load center on the flexible medium 100 is changed, travel amount information is input by means of entering, for example, the amounts of rotation (i.e., the amount of operation and control) of the rollers 301 and 302 which come into contact with the flexible medium 100.

The present embodiment describes a case where points at which the flexible medium 100 comes into contact with the rollers 301 and 302, such as those shown in FIGS. 16A through 19B, are taken as shifting load centers of the flexible medium 100. At this time, it is supposed that a minute area at which the flexible medium 100 is in contact with the roller 301 and another minute area at which the flexible medium 100 is in contact with the roller 302 move in association with rotation of the respective rollers 301 and 302.

In this case, the amounts of rotation of the respective rollers 301 and 302 are given as travel amount information by a single input operation. During the course of travel of the flexible medium 100 in accordance with the amount of rotation, the flexible medium 100 is released from the roller 302, or the flexible medium 100 newly comes into contact with the roller 302. In a case where the two rollers 301 and 302 come into contact with and act on the flexible medium 100, there may be a case where the amounts of rotation of the rollers 301 and 302 are determined by means of a load balance between the rollers 301 and 302.

In such a situation, the position/posture computation section 131 according to the present embodiment computes a timing (i.e., a ratio to be described later) at which the positional relationship between the rollers 301 and 302 and the flexible medium 100 is changed. The motion and posture of the flexible member 100 are computed separately before and after the timing. More specifically, when the travel of the flexible medium 100 induced with a shifting load center is simulated, the positions at which the rollers 301 and 302 act on the flexible medium 100 are changed in association with the travel of the flexible medium 100. Hence, the position/posture computation section 131 determines a load center for each computation, and computes the position and posture of the flexible medium 100 in accordance with displacement of the load center.

Simulation of travel of the flexible medium 100 induced at a shifting load center will be described in accordance with the flowchart (steps S31 through S38) shown in FIG. 6.

In a case where a plurality of rollers (1 through "n": a plurality of shifting load centers) come into contact with the flexible medium 100 by means of entry of a single travel amount information piece, the amount of travel qi (i=1 to n) of each of the rollers (i.e., each of the shifting load centers) is computed. The thus-computed amounts of travel are preserved as an arrangement Q(n). For instance, as shown in FIGS. 16A through 19B, when two rollers 301 and 302 remain in contact with and act on the flexible medium 100, the amount of movement q1 of the roller 301 and the amount of movement q2 of the roller 302, which correspond to a single input operation, are computed.

In the following description, provided that the total travel time (or total amount of travel) of a certain shifting load center "i" (i.e., a roller) induced by a single input operation is taken as T and that a period of time from when travel of the roller is started in response to an input operation until the time when the positional relationship between the shifting load center (roller) "i" and the flexible medium 100 is changed is taken as S, a ratio of S to T (S/T) is taken as a travel ratio "ratio-i." If there is no change of the positional relationship when a single input operation is performed, "1" is set for the travel ratio "ratio-i".

Upon receipt of the arrangement Q(n) that has been obtained by a single input operation of travel amount information (step S31), the position/posture computation section 31 sets the travel ratio "ratio" of each of the rollers "i" to a maximum value of "1" as a default setting (step S32). Subsequently, the position/posture computation section 31 checks whether or not the input operation of this time induces a change in positional relationship between each of the rollers "i" and the flexible-medium 100. Timings at which a change arises between the positional relationship between each of the rollers "i" (301 and 302) and the flexible medium 100 are of the following three types.

(a) A timing at which the flexible medium 100 is released from the roller "i." (see FIGS. 16A and 16B).

(b) A timing at which the flexible medium 100 comes into contact with a new roller "i" (see FIGS. 17A and 17B).

(c) A timing at which a slack of the flexible medium 100 located between rollers disappears (see FIGS. 18A and 18B).

It is considered that the positional relationship is changed for the following reasons at the timing described in (c). When a slack is present in the flexible medium 100 situated between the rollers, the roller 302 shown in FIG. 18B can rotate as instructed through the input operation. However, if the slack in the flexible medium 100 has disappeared, the roller 302 will no longer be able to rotate as instructed by the input operation under influence of the roller 301 even when an attempt is made to rotate the roller 302; rotation of the roller 302 will be determined depending on the rotation of the roller 301.

For instance, when the rollers 301 and 302 rotate in opposite directions, the flexible medium 100 will be stretched. For this reason, rotation of the roller 302 is limited. Thus, the amount of rotation of the roller 302 is changed depending on whether or not a slack is present in the flexible medium 100. In the present embodiment, a timing at which a slack in the flexible medium 100 disappears is taken as a timing at which the positional relationship between the flexible medium 100 and the roller is changed.

From the rollers 1 through "n," the position/posture computation section 31 selects a roller which is to act on the flexible medium 100 (step S33). Further, the position/posture computation section 31 determines a travel time S (or the amount of travel) of a roller, which is the duration from the current time point to when a first change arises in positional relationship between the flexible medium 100 and the roller. Further, a travel ratio "ratio," which is a ratio of the travel time S (or the amount of travel) to a total travel time T (total amount of travel) of the roller resulting from an input operation of this time, is computed (step S34). At this time, when a change in positional relationship, such as that mentioned previously, arises in association with the current input operation, S<T, and a value of 1 or smaller is set for the travel ratio "ratio". In contrast, when no change arises in positional relationship, a value of "1" is set for the travel ratio "ratio".

The amount of travel of each of the rollers "i" between the current time point and when a first change arises in positional relationship between the flexible medium 100 and the roller, is computed by the position/posture computation section 131 as the amount of travel qi*ratio corresponding to the travel ratio "ratio" (step S35). From the thus-computed amount of travel of each of the rollers "i," the position/posture computation section 131 computes a three-dimensional transport position and a two-dimensional posture of the flexible medium 100 (step S36). A method analogous to that mentioned previously and employed in steps S12, S13, S22, S24, and S26 is employed for computing the three-dimensional transport position and two-dimensional posture of the flexible medium 100.

At this time, if the adjacent rollers 301 and 302 rotates in the same direction at different speed, the flexible medium 100 is stretched in the manner as shown in FIG. 19A, or a slack arises in the flexible medium 100 in the manner as shown in FIG. 19B. When the flexible medium 100 is stretched, one of the rollers 301 and 302 will undergoes sliding action or no rotation, depending on the friction coefficients of the rollers 301 and 302 and on the torque of a motor. In order to facilitate the processing, there may be employed a technique of stopping the rotation of the rollers 301 and 302 in the above-described situation.

The position/posture computation section 131 discriminates whether to terminate processing, on the basis of the value of the travel ratio "ratio" computed in step S34, after the position and posture of the flexible medium 100 have been computed (step S37). Here, the discrimination is made as to whether or not the travel ratio "ratio" equals "1."

The fact that the travel ratio "ratio" computed in step S34 is "1" (YES is selected in step S37) means that no change has arisen in positional relationship between either of the rollers "i" and the flexible medium 100. In this case, the position and posture of the flexible medium 100 have already been computed from the total amount of travel of the roller induced by the current input operation in step S35. Hence, the position and posture computation section 131 terminates processing.

In contrast, if the travel ratio "ratio" computed in step S34 does not take "1" (NO is selected in step S37), it means the position and posture of the flexible medium 100 have not yet been computed from the total amount of travel of the roller induced by the current input operation. Hence, processing corresponding to the amount of travel after a change has arisen in positional relationship must be continued. Hence, the position/posture computation section 131 computes the amount of remaining travel of each of the rollers "i" as qi*(1-ratio). After the amount of travel qi*(1-ratio) has been replaced with the total amount of travel (total travel time) of each of the rollers "i" (step S38), processing returns to step S32, where the same processing as mentioned above is repeatedly performed.

There will now be described a case where specific examples shown in FIGS. 16A through 18B are applied to the flowchart shown in FIG. 6.

As shown in FIGS. 16A and 16B, when a change arises in positional relationship between the flexible medium 100 and the roller 302 at a timing in which the flexible medium 100 is released from the roller 302, the two rollers 301 and 302 are selected in step S33 of the first loop. In step S34, the ratio between the amount of travel (travel time) S required by the roller 302 until the flexible medium 100 is released from the roller 302 and the total amount of travel (total travel time) T entered this time; that is, S/T, is computed as a travel ratio "ratio."

Since a change arises in positional relationship between the roller 302 and the flexible medium 100 before and after the timing at which the flexible medium 100 travels by the amount of travel S, the motion (position and posture) of the flexible medium 100 until that timing is computed in steps S35 and S36 of the first loop. The three-dimensional transport position information 25 and the two-dimensional posture information 26, both pertaining to the flexible medium 100, are updated.

At this time, if the travel ratio "ratio"=S/T is smaller than 1, NO is selected in step S37. In step S38, the total amount of travel (total travel time) T is replaced with T*(1-S/T)= T-S, and processing proceeds to step S32; that is, to the second loop.

In the second loop, only the roller 301 is selected in step S33. Since the remaining amount of travel T-S is not sufficient for the flexible medium 100 to be released from the roller 301, a value of "1" is computed as the travel ratio "ratio" in step S34.

In steps S35 and S36, the motion (position and posture) of the flexible medium 100 is computed from the previous position and posture of the flexible medium 100 in consideration of the amount of travel (T-S) made by the roller 301 this time. Thus, the three-dimensional transport position information 25 and the two-dimensional posture information 26, both pertaining to the flexible medium 100, are updated.

In a case where the flexible medium 100 is released from the roller 301 by means of the remaining amount of travel T−S of the roller 301, processing analogous to that performed in the previously-described first loop is performed. NO is selected in step S37, and processing proceeds to the third loop. If the flexible medium 100 is not yet released from the roller 302 in the first loop even when the flexible medium 100 has traveled in accordance with the total amount of travel T, a value of "1" is set for the travel ratio "ratio" as the computation result of step S34. The position/ posture computation section 131 computes the position and posture of the flexible medium 100, and YES is selected in step S37, whereby processing is terminated.

As shown in FIGS. 17A and 17B, when a change arises in positional relationship at a timing at which the flexible-medium 100 comes into contact with another roller "i," the roller 301 is selected in step S33 of the first loop. In step S34, the ratio between the amount of travel (travel time) S required by the roller 302 until the flexible medium 100 comes into contact with a new roller 302 and the total amount of travel (total travel time) T entered this time; that is, S/T, is computed as a travel ratio "ratio."

As mentioned previously, since a change arises in positional relationship between the roller 302 and the flexible medium 100 before and after the timing at which the flexible medium 100 travels by an amount of travel S, the motion (position and posture) of the flexible medium 100 until that timing, is computed in steps S35 and S36 of the first loop. The three-dimensional transport position information 25 and the two-dimensional posture, information 26, both pertaining to the flexible medium 100, are updated.

At this time, if the travel ratio "ratio" (=S/T) is smaller than 1, NO is selected in step S37. In step S38, the total amount of travel (total travel time) T is replaced with T*(1−S/T)=T−S, and processing proceeds to step S32; that is, to the second loop.

In the second loop, the rollers 301 and 302 are selected in step S33. Since the remaining amount of travel T−S is not sufficient for the flexible medium 100 to be released from the roller 301, a value of "1" is computed as the travel ratio "ratio" in step S34.

In steps S35 and S36, the motion (position and posture) of the flexible medium 100 is computed from the previous position and posture of the flexible medium 100 in consideration of the amount of travel (T−S) made by the roller 301 this time. Thus, the three-dimensional transport position information 25 and the two-dimensional posture information 26, both pertaining to the flexible medium 100, are updated.

If, according to the remaining amount of travel T−S of the roller 301, the flexible medium 100 is released from the roller 301, the same processing as performed in the previously-described first loop is performed. NO is selected in step S37, and processing proceeds to the third loop. If the flexible medium 100 does not come into contact with another roller 302 in the first loop even after the flexible medium 100 has traveled in accordance with the total amount of travel T, the travel ratio "ratio" computed in step S34 is "1". The position/posture computation section 131 computes the position and posture of the flexible medium 100, and YES is selected in step S37, whereby processing is terminated.

As shown in FIGS. 18A and 18B, when a change arises in positional relationship between the flexible medium 100 and the rollers at a timing at which a slack in the flexible medium 100 situated between the rollers 301 and 302 disappears, the rollers 301 and 302 are selected in step S33 of the first loop. In step S34, the ratio between the amount of travel (travel time) S required by the rollers 301 and 302 until a slack in the flexible medium 100 disappears and the total amount of travel (total travel time) T entered this time; that is, S/T, is computed as a travel ratio "ratio."

As mentioned previously, a change arises in positional relationship between the roller 302 and the flexible medium 100 before and after the timing at which the flexible medium 100 travels by the amount of travel S. In other words, the roller 302 can be rotated without constraints until a slack in the flexible medium 100 disappears. When a slack in the flexible medium 100 disappears, the roller 302 cannot rotate faster than the roller 301.

Accordingly, the motion (position and posture) of the flexible medium 100 until that timing is computed in steps S35 and S36 of the first loop. The three-dimensional transport position information 25 and the two-dimensional posture information 26, both pertaining to the flexible medium 100, are updated.

At this time, if the travel ratio "ratio" (=S/T) is smaller 1, NO is selected in step S37. In step S38, the total amount of travel (total travel time) T pertaining to each of the rollers 301 and 302 is replaced with T*(1−S/T)=T−S, and processing proceeds to step S32; that is, to the second loop. In step S32 and subsequent steps, processing the same as that mentioned previously is repeated.

[2-5] Description concerning simulation of the turning-over of pages of a notebook-shaped medium:

When travel amount information is judged relating to (4) the turning-over of pages of a notebook-shaped medium, simulation of the turning-over of a notebook-shaped medium is effected in accordance with procedures provided in the flowchart (i.e., steps S31' through S36', S41 through S58, and S61 through S72) shown in FIGS. 7 through 10. Procedures will be described by reference to FIGS. 21A through 25C.

Figure 7:
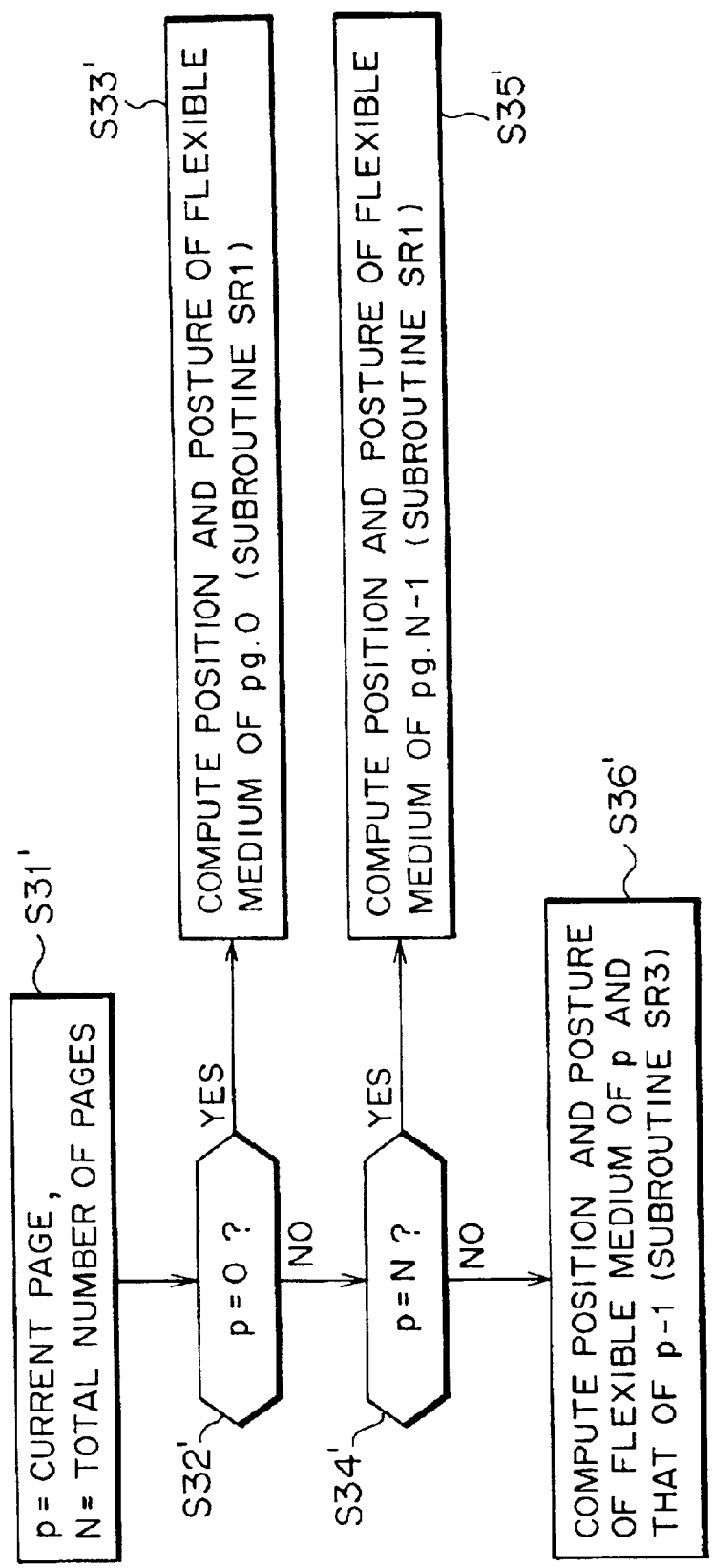
FIG. 7 is a flowchart for describing the overall flow of simulation of the turning-over of a notebook-shaped medium to be performed in the flexible medium transport simulation apparatus according to the present embodiment.
Figure 8:
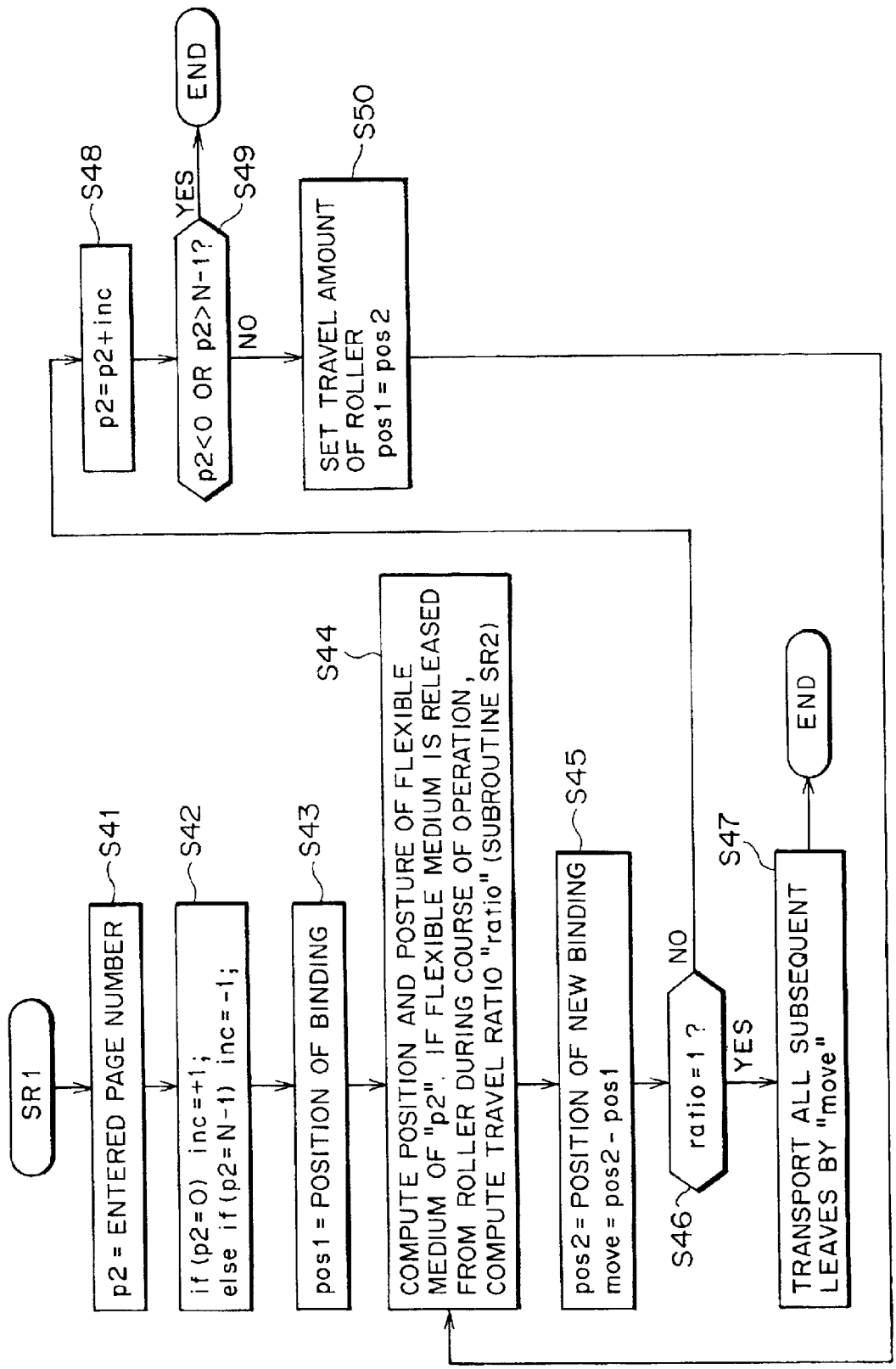
FIGS. 8 through 10 are flowcharts for describing detailed simulation of the turning-over of a notebook-shaped medium to be performed in the flexible medium transport simulation apparatus according to the present embodiment.
Figure 9:
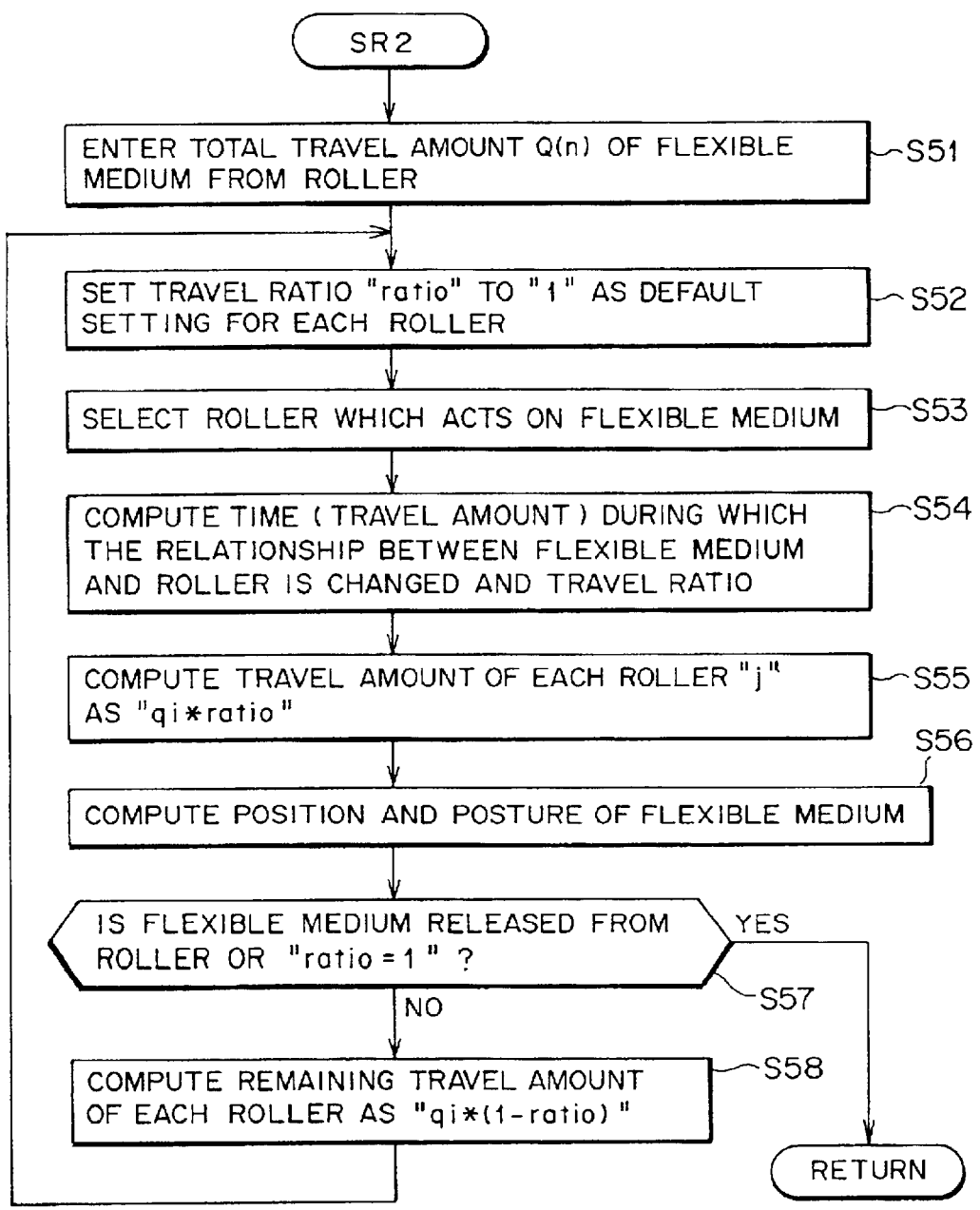
Figure 10:
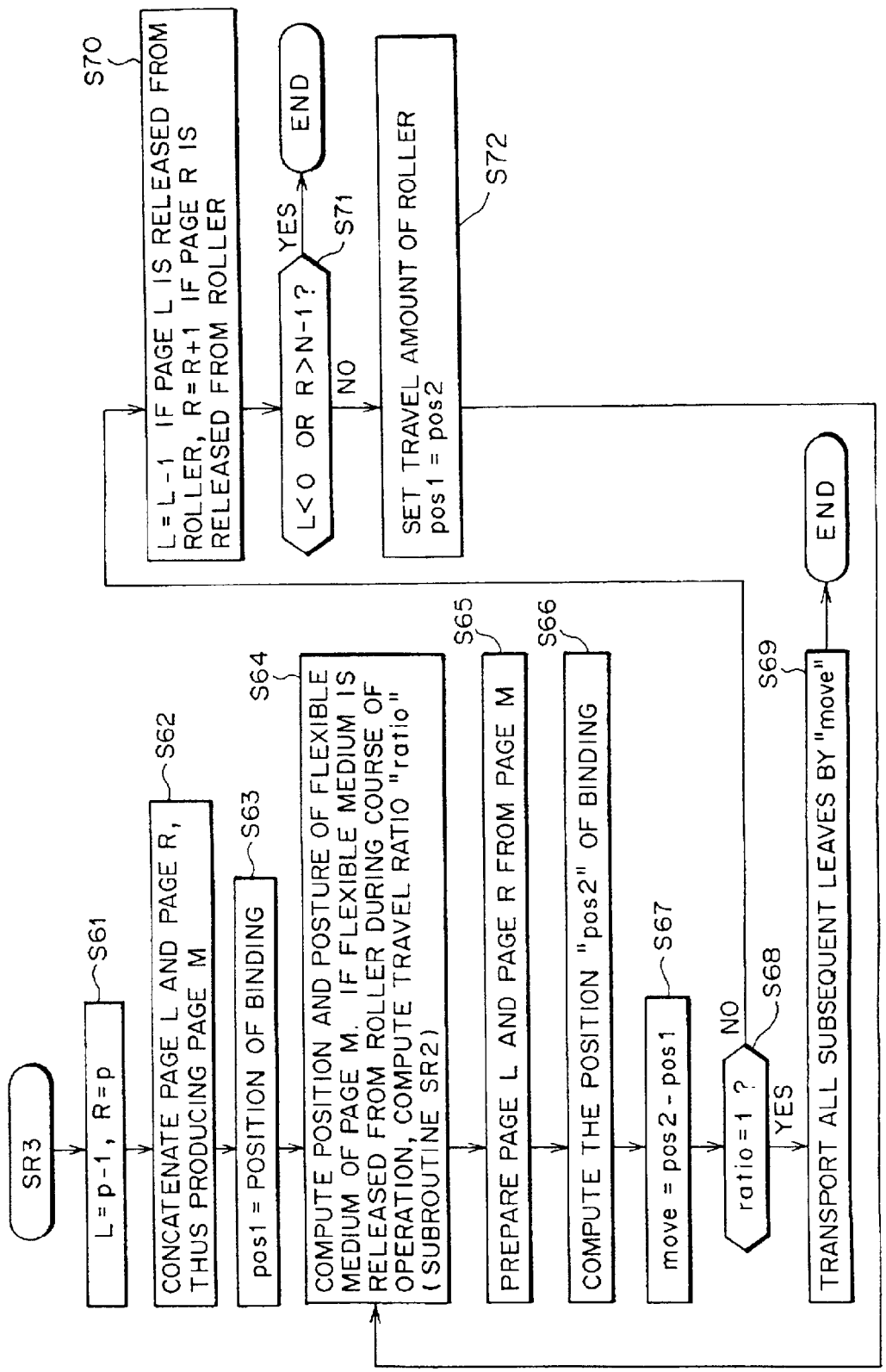
Figure 25B:
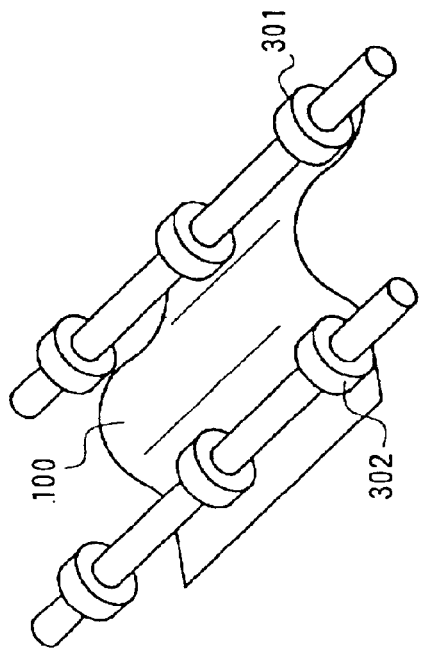
FIGS. 25A through 25C are illustrations showing an example of display of simulation result according to the present embodiment.
Figure 25A:
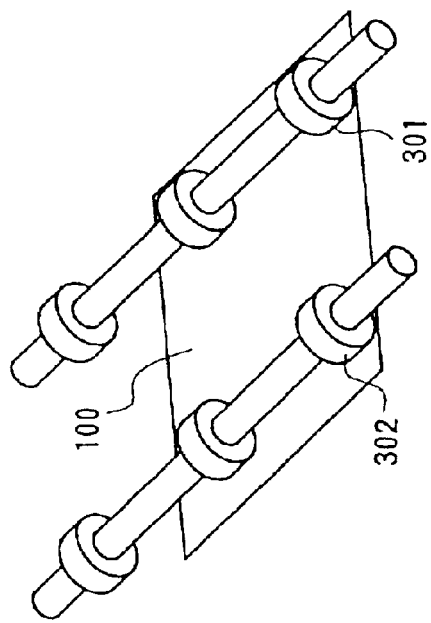
Figure 25C:
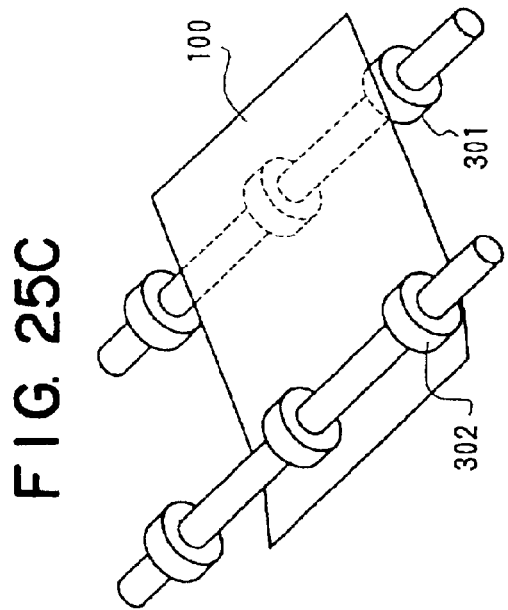

FIG. 7 is a flowchart for describing the overall flow of simulation of the turning-over of a notebook-shaped medium (i.e., a bankbook 200). FIGS. 8 through 10 are flowcharts for describing details of simulation of the turning-over operation. As mentioned previously, FIGS. 21A and 21B are drawings for describing definitions of variables pertaining to leaves of the bankbook 200 according to the present embodiment. FIGS. 22A through 24B are drawings for describing simulation of a turning-over operation according to the present embodiment. FIGS. 25A through 25C are drawings for showing examples of display of simulation results according to the present embodiment.

There will now be described simulation of a case where the transport mechanism transports a flexible medium (a notebook-shaped medium) consisting of a plurality of leaves, such as a book or a bankbook. The bankbook 200 serving as a notebook-shaped medium (see FIGS. 21A and 21B) differs from the flexible medium 100 of a single sheet, in that, the sheets of the medium are bound one another at one of the ends of the sheets.

The overall simulation of the bankbook 200 proceeds in accordance with the flowchart shown in FIG. 4. Since leaves of the bankbook 200 is moved all at once, all the leaves 201 of the bankbook 200 are assigned common movement operation variables. Travel amount information is input through use of the variables. The simulation of movement of the overall bankbook 200 is substantially the same as in the case of a single sheet of paper (i.e., a flexible medium) 100. The position/posture computation section 131 performs computing operation in consideration of the thickness of each of the leaves 201, thereby determining the position of the bankbook 200 with an offset from the transport path.

Travel of the bankbook 200 induced with a stationary load center is simulated in accordance with the flowchart shown in FIG. 5. At that time, the position of the stationary load center is limited on the externally-exposed leaf 201 of the bankbook (a notebook-shaped medium) 200. The subject of operation is limited such that only the externally-facing leaf (or an open leaf) 201 is subjected to operation. As a result, the position and posture of the bankbook 200 can be computed in the same manner as in the case where only a single sheet of flexible medium 100 is simulated.

Travel of the bankbook 200 induced with a shifting load center; that is, the turning-over of leaves of the bankbook 200 by means of a roller, is simulated in accordance with the flowcharts shown in FIGS. 7 through 10.

The structure of leaves of the bankbook 200 and the definition of a current page number will now be described by reference to FIGS. 21A and 21B. The bankbook 200 shown in FIGS. 21A and 21B has five leaves 201 (i.e., a total number of leaves N=5), and the leaves are assigned page numbers 0 through 4, respectively.

As shown in FIG. 21A, in the present embodiment, the state where the bankbook 200 is closed with a leaf 201 of page number 0 (i.e., the front page) lying on top of the bankbook 200 is taken as page "p=0." As shown in FIG. 21B, the state where only a single top leaf 201 of the bankbook 200 is turned over thus leaving leaves 201 of page numbers 0 and 1 of the bankbook 200 open, is taken as page "p=1."

In the same manner, the state in which leaves 201 of page numbers 1 and 2 of the bankbook 200 are open is taken as page "p=2." The state in which leaves 201 of page numbers 2 and 3 of the bankbook 200 are open, page "p=3." The state in which leaves 201 of page numbers 3 and 4 of the bankbook 200 are open, page "p=4." Contrary to the example shown in FIG. 21A, the state in which the bankbook 200 is closed leaving the final leaf 201 (of page number N−1=4: i.e., an back cover) lying on top of the bankbook 200, is taken as page "p=N=5."

When judged that the input travel amount information relates to the turning-over of a page of the bankbook 200, the position/posture computation section 131 performs processing assigned to the current page number in accordance with the flowchart shown in FIG. 7.

More specifically, the position/posture computation section 131 acquires a page "p" representing the current status of the bankbook 200 and the total number N of the pages of the bankbook 200 (step S31'), and discriminates whether or not p=0 (i.e., whether or not the bankbook 200 is in the state shown in FIG. 21A) (step S32').

If p=0 (YES is selected in step S32'), the position/posture computation section 131 computes the position and posture of the leaf (flexible medium) 201 of page number 0 on top of the bankbook 200 in accordance with the flowchart (i.e., a subroutine SR1) shown in FIG. 8 (step S33').

In contrast, if p≠0 (NO is selected in step S32'), the position/posture computation section 131 discriminates whether or not p=N [that is, whether or not the final leaf 201 (i.e., a leaf 201 of page number N−1) is on top of the bankbook 200] (step S34').

In a case where p=N (YES is selected in step S34'), the position/posture computation section 131 computes the position and posture of the leaf (flexible medium) 201 of page number N−1 on top of the bankbook 200 in accordance with the flowchart (i.e., the subroutine SR1) shown in FIG. 8 (step S35').

In contrast, if p≠N (NO is selected in step S34') that is, p=1 through N−1, the position/posture computation section 131 recognizes the leaf 201 of page number p−1 and the leaf 201 of page number "p" are now open in the bankbook 200 and computes the position and posture of each of the leaves (flexible mediums) 201 in accordance with the flowchart (i. e. a subroutine SR3) shown in FIG. 10 (step S36').

[2-5-1] Description concerning simulation of the turning-over of a front cover or a back cover:

Procedures for simulating the turning-over of a front cover or a back cover of the bankbook 200 (i.e., the subroutine SR1) will be described in detail by reference to FIGS. 22A through 24B and in accordance with the flowchart (steps S41 through S50) shown in FIG. 8.

As shown in FIGS. 22A through 24B, the rollers 301 and 302 remain in contact with the top leaf (i.e., the front cover or the back cover) 201 of the bankbook 200 from above. In the subroutine SR1, the amount of travel of the top leaf which will be induced by the rollers 301 and 302 is computed, thereby simulating the turning-over of the leaf 201. At this time, there may be a case where the roller 301 will come into contact with and act on a leave (s) 201 located below the front cover or the back cover. A turning-over pattern for such a case is shown in FIGS. 22A through 24B.

In the pattern shown in FIGS. 22A and 22B, the overall bankbook 200 is moved in association with rotation of the plurality of rollers 301 and 302, with the result that the top leaf (flexible medium) 200 is released from the roller 301. In this pattern, the leaf 201 to be turned over by the roller 301 is first the front cover or the back cover. In the middle of the turning-over of a leaf in response to a single input operation, the next leaf 201, located below the front cover or the back cover, starts to be turned over by the roller 301. At this time, provided that the total travel time (i.e., the total amount of travel of a leaf 201) induced by a single input operation is designated by "T" and that a travel time (the amount of travel of the leaf 201) required, from the start of the roller-induced travel, for the roller 301 to come into contact with the next leaf 201 located beneath the current leaf 201, is designated by "V", the top leaf 201 (i.e., the front cover or the back cover) is moved for a period of time T, and the next leaf 201 is moved for a period of time (T−V).

Even in the patterns shown in FIGS. 23A and 23B, the overall bankbook 20 is moved in association with rotation of the plurality of rollers 301 and 302. However, in this pattern, the top leaf (flexible medium) 201 is released from the roller 301 from the beginning. In other words, in this pattern, the next leaf 201 located below the top leaf 201 is turned over by the roller 301 from the beginning, and thereby the upper and lower leaves 201 are moved for a period of time T.

In the patterns shown in FIGS. 24A and 24B, the only one roller, 301, is in contact with and acts on the top leaf (flexible medium) 201 of the bankbook 200. In the middle of traveling induced by a single input operation, the top leaf (flexible-medium) 201 is released from the roller 301. At this time, the top leaf 201 is transported for a period of time V, and the subsequent leaf 201 located below the top leaf 201 is moved for a period of time (T−V).

In any of the patterns of the turning-over of leaves by use of the rollers 301 and 302, consideration must be given to turning-over with interrelated movements of upper and lower leaves. In processing pertaining to the subroutines SR1 through SR3 to be described later, consideration is given to the turning-over of leaves set forth.

In the subroutine SR1 shown in FIG. 8, upon receipt of a leaf 201 of page number p2 which is a subject of processing (step S41), the position/posture computation section 131 sets a parameter "inc" for incrementing/decrementing a page number in accordance with the page number p2 (step S42).

The page number p2 to be input assumes either 0 or N−1. In a case where p2=0 (i.e., the bankbook 200 is turned over through from the front cover), a value of "+1" is set as "inc" so that the page number p2 is incremented in association with turning-over action. In contrast, where p2=N−1 (i.e., the bankbook 200 is turned over through from the back cover), a value of "−1" is set as "inc" so that the page number p2 is decremented in association with turning-over action.

The position/posture computation section 131 obtains the current position of the binding as pos1 (step S43) and computes the position and posture of the leaf (flexible medium) 201 of page p2 in accordance with the subroutine SR2 (steps S51 through S58) shown in FIG. 9. When the leaf 201 is released from the roller 301, the travel ratio "ratio" is computed (step S44).

Next will be described processing pertaining to the subroutine SR2. Steps S51 through S58 of the subroutine SR2 correspond to steps S31 through S38 of the flowchart shown in FIG. 6 (i.e., simulation of travel of a leaf induced with a shifting load center).

In short, upon receipt of the total amounts of rotation of respective rollers (i.e., the arrangement Q) which have been induced by a single input operation of travel amount information (step S51), the position/posture computation section 131 sets the travel ratio "ratio" of each of the rollers to a maximum value of "1" as a default setting (step S52). Subsequently, a check is made as to whether or not an input operation of this time induces a change in positional relationship between the leaf 201 and the roller 301; that is, as to whether or not the leaf 201 is released from the roller 301.

The position/posture computation section 131 selects the rollers 301 and 302 that come into contact with the leaf 201 from among a plurality of rollers (step S53). Further, the position/posture computation section 131 computes a travel time V (or the amount of travel) from the current point in time until when a first change arises in positional relationship between the leaf 201 and the roller 301, and also computes the travel ratio "ratio" (step S54).

Here, the travel time V is a period of time from the current point in time until the time when a first change arises in positional relationship between the leaf 201 and the roller 301. Particularly, when the leaf 201 is released from the roller 301, the travel time V corresponds to a period of time from the current point in time until the time when a lower leaf 201 starts traveling upon being subjected to rotation of the roller 301. Provided that the total travel time (i.e., the total amount of rotation) of the roller 301 associated with the input operation of this time is designated by "T", the travel ratio "ratio" is computed as "V/T". When the leaf 201 is released from the roller 301 in association with the input operation of this time, V<T, and the travel ratio "ratio" is smaller than 1. In contrast, when an upper leaf 201 is not released from the roller 301; namely, when the roller 301 does not act on a lower leaf 201, the travel ratio "ratio" equals 1.

The position/posture computation section 131 computes the amounts of rotation of the rollers 301 and 302 from the current point in time until the time when a first change arises in positional relationship between an upper leaf (flexible medium) 201 and the roller 301 as the amount of travel qi*ratio (i=1, 2) corresponding to the travel ratio "ratio" (step S55). From the thus-computed amounts of rotation of the rollers 301 and 302, the three-dimensional transport position and two-dimensional posture of an upper leaf 201 are computed (step S56). At this time, the same method as that used in steps S12, S13, S22, S24, and S26 is used as a method of computing a three-dimensional transport position and a two-dimensional posture.

After having computed the position and posture of an upper leaf 201, the position/posture computation section 131 determines termination of the subroutine SR2, depending on whether or not the upper leaf (flexible medium) 201 is released from the roller 301 or whether or not the travel ratio "ratio" computed in step S54 is a value of "1" (step S57).

When the upper leaf 201 is released from the roller 301 (YES is selected in step S57), the position/posture computation section 131 terminates the subroutine SR2 and returns to the subroutine SR1, where the page number p2 is updated in the manner as will be described later.

When the travel ratio "ratio" computed in step S54 is a value of "1" (YES is selected in step S57), it means no change has arisen in positional relationship between the rollers 301, 302 and the upper leaf 201. In this case, since the position and posture of the leaf 201 have already been computed, in step S55, from the total amount of travel induced by the input operation of this time, the position/posture computation section 131 terminates the subroutine SR2 and returns to the subroutine SR1.

When the upper leaf (flexible medium) 201 is not released from the roller 301 and the travel ratio "ratio" computed in step S54 does not equal "1" (NO is selected in step S37), the position/posture computation section 131 continues processing in accordance with the amount of travel made after a change arises in positional relationship. The position/posture computation section 131 computes the remaining amounts of rotation of the respective rollers 301 and 302 as qi*(1-ratio) After the amount of rotation qi*(1-ratio) has been replaced with the total amount of rotation (i.e., the total travel time) of the respective rollers 301 and 302 (step S58), processing returns to step S52, where processing the same as that mentioned previously is performed repeatedly.

After completion of the subroutine SR2, the position/posture computation section 131 computes the position of a new binding of the bankbook 200 as pos2. After the difference between the position of the previous binding pos1 and the position of a new binding pos2 (pos2−pos1) has been computed (step S45), a discrimination is made as to whether or not the travel ratio "ratio" computed in step S44 (subroutine SR2) is a value of "1" (step S46).

If the travel ratio=1 (i.e., YES is selected in step S46), it means the position and the posture of a leaf 201 have already been computed from the total amount of travel of the rollers induced by the input operation of this time. The position/posture computation section 131 shifts the overall lower leaf 201 (i.e., the bankbook 200) only the amount of travel "move" computed in step S45 (step S47), thus completing simulation of turning-over operation.

Otherwise if the travel ratio "ratio"≠1 (i.e., NO is selected in step S46), the position/posture computation section 131 updates the page number p2 to p2+inc (step S48) and discriminates whether or not the thus-updated page number p2 satisfies (p2<0), meaning the updated page number is smaller than 0, or satisfies (p2>N−1), meaning the updated page number is larger than a total number N of leaves (step S49).

If the updated page number p2 is smaller than 0 or equal to or larger than the total number N of leaves (YES is selected in step S49), it means all the leaves of the bankbook 200 have already been turned over through, and hence the position/posture computation section 131 terminates processing.

If the updated page number p2 satisfies $0 \leq p2 < N$ (i.e., NO is selected in step S49), it means the turning-over of leaves should be continued in accordance with the input operation of this time. Hence, the position/posture computation section 131 sets qi*(1-ratio) for the amounts of rotation of the rollers 301 and 302. After the position of the binding p2 obtained in step S45 has been replaced with the position p1 (step S50), processing returns to step S44, where processing analogous to that mentioned previously is performed repeatedly.

In the above-described processing, the leaf 201 of page number p2 is taken as an upper leaf, and a leaf 201 of page number (p2+inc) is taken as a lower leaf. So long as the roller 301 affects (acts on) the lower leaf 201, simulation of the turning-over of the lower leaf 201 is continued. As mentioned in connection with step S50, the amount of travel of the lower leaf 201 is set to a value obtained by multiplying the amount of first rotation q1 of the roller 301 by (1-ratio). Here, the portion of the lower leaf 201 which does not come into contact with the roller 301 is moved in synchronism with travel of an upper leaf 201.

On the basis of the results of the simulation of the turning-over operation, such as those mentioned previously, the three-dimensional image preparation section 132 prepares a three-dimensional image. FIGS. 25A through 25C show an example of a three-dimensional image of a flexible medium (i.e., the leaf 201) appearing on the display 30. As illustrated in FIGS. 25A through 25C, the three-dimensional images (component images) of the rollers 301 and 302 serving as a transport mechanism are also shown on the display 30.

The three-dimensional image of FIG. 25A shows the state in which the rollers 301 and 302 are in contact with an upper leaf 201, just before the rollers 301 and 302 start turning over leaves. From the state shown in FIG. 25A, the turning-over of leaves is started. FIG. 25B is a three-dimensional image showing the state just before the roller 301 comes into contact with a lower leaf (not shown) (i.e., immediately before a change arises in positional relationship between the roller 301 and the leaf). A three-dimensional image shown in FIG. 25C shows the state in which an upper leaf 201 is released from the roller 301 and curls up over the roller 301.

[2-5-2] Description concerning the turning-over of a double spread:

Detailed procedures for simulating the turning-over of a double spread of the bankbook 200 (subroutine SR3) will be described in accordance with a flowchart shown in FIG. 10 (steps S61 through S72).

In the subroutine SR3, pages L and R, which are in a double-spread state, are both moved. Computing the roller-induced travel for each of the pages L and R, separately, makes it difficult to associate those pages L and R afterward. As will be described later, in the subroutine SR3, the two pages L and R, which are in a double-spread state, are thus taken as forming a single page (flexible medium) M, and the position and the posture of the page M are computed.

Connecting the two pages L and R makes the position of connection (i.e., a binding) uncertain. Hence, the position of connection is computed at last. Even in processing pertaining to the subroutine SR3, consideration is given to the interrelated turning-over of leaves already mentioned by reference to FIGS. 22A through 24B.

In the subroutine SR3 shown in FIG. 10, when page numbers "p" and "p−1" are set and entered as two pages L and R which are in a double-spread state (step S61) the position/posture computation section 131 concatenates the pages L and R into a single page M (step S62) and computes the current position of a binding of the bankbook 200 as pos1 (step S63).

At this time, the position/posture computation section 131 computes the position and posture of the page (flexible medium) M in accordance with the subroutine SR2 (i.e., steps S51 through S58) shown in FIG. 9. When the page M is released from a roller during the course of operation, the position/posture computation section 131 computes a travel ratio "ratio" (step S64). Processing pertaining to the subroutine SR2 is identical with that mentioned previously, and hence a repeated explanation thereof is omitted.

After completion of the subroutine SR2, the position/posture computation section 131 prepares a page L and a page R from the page M which has been processed in the subroutine SR2 (step S65). Further, a new position of the binding of the bankbook 200 is computed as pos2 (step S66). After the difference between the new position of the binding pos2 and the previous position of the binding pos1 (that is, pos2−pos1) has been computed as the amount of travel "move" (step S67), a discrimination is made as to whether or not the travel ratio "ratio" computed in step S64 (subroutine SR2) is "1" (step S68).

If the travel ratio "ratio"=1 (i.e., YES is selected in step S68), it means the position and the posture of the page have already been computed from the total amount of travel of the rollers induced by the input operation of this time. The position/posture computation section 131 shifts the overall lower page (i.e., the bankbook 200) by the amount of travel "move" computed in step S67 (step S69), thus completing the simulation of the turning-over operation.

In the case of travel ratio "ratio"≠1 (i.e., NO is selected in step S68), the position/posture computation section 131 updates a page number; for instance, L=L−1 if the page released from the roller is L, or R=R+1 if the page released from the roller is R (step S70) and discriminates whether or not the thus-updated page L is smaller than 0 (L<0) or the updated page R is equal to or larger than a total number of leaves N (R>N−1) (step S71).

If the updated page number L is smaller than 0 or greater than the total number of leaves N (YES is selected in step S71), this means all leaves of the bankbook 200 have already been turned over through, and hence the position/posture computation section 131 terminates processing.

Otherwise if the updated page number L is equal to or larger than "0" or if the updated page number R is smaller than N (i.e., NO is selected in step S71), the turning-over of leaves is continued in accordance with the input operation of this time. Hence, the position/posture computation section 131 sets qi*(1-ratio) for the amounts of rotation of the rollers. After the position of the binding p2 obtained in step S66 has been replaced with the position p1 (step S72), processing returns to step S64, where processing the same as that mentioned previously is performed repeatedly.

Through the foregoing processing, so long as the roller affects (acts on) a lower leaf even in the subroutine SR3, simulation of the turning-over of a lower leaf is continued.

[2-6] Description concerning a three-dimensional model of a flexible medium:

As mentioned above, demand exists for displaying, at high speed, the result of computation of motion or posture of the flexible mediums 100 and 200 in the form of three-dimensional models. Accurate generation of a flexible medium model (i.e., a three-dimensional image) consisting of curved surfaces requires enormous amounts of computation cost.

For this reason, in the present embodiment, the paper sheet 100 and leaves 201 of the bankbook 200, which act as flexible mediums, are handled as three-dimensional models as shown in FIGS. 20A through 20C. Thereby, the three-dimensional image formation section 132 can very easily and accurately produce a flexible medium model (i.e., a three-dimensional model) consisting of curved surfaces from the two-dimensional posture computed by the position/posture computation section 131.

A three-dimensional model of the flexible medium 100 (leaf 201) of FIG. 20A, which has a length L in the transporting direction and a width W in the widthwise direction, is constituted of a plurality of strip-shaped members 101, as shown in FIG. 20B, which members 101 are connected one another such that the strip-shaped members 101 can rotate about rotation axes 102 parallel to the widthwise direction of the flexible member. As a result, a change in the posture (deformation) of the flexible medium 100 (201) can be expressed, merely by changing an angle between the adjacent strip-shaped members 101.

[2-7] Description concerning the method of moving a flexible medium:

There are two types of methods of moving the flexible medium 100 (or a leaf 201) in accordance with the entered amount of travel; that is, a method of using joints and a method of using a path.

According to the former method of using joints, in a case where a flexible medium is transported by means of rollers, rotary joints are set for the rollers, and a slide joint is set for a flexible-medium. A relationship with respect to the amount of travel is set between these two types of joints. The relationship is a proportional relationship, for example, such that the slide joint traveling "b" causes the rotary joint to rotate by an angle of "a". By means of setting joints and the relationship between the joints in advance, a flexible medium can be translated in accordance with the amount of rotation inputted to the rollers.

According to the latter method of using a path, a flexible medium 100, 200 is moved along the transport path which has been set in advance. The present embodiment employs this method, and thus a transport path 300 for the flexible medium 100, 200 is set as the three-dimensional transport path information 23 in advance, by means of the transport path setting section 12.

The position/posture computation section 131 can considerably easily compute the position of the flexible medium 100, 200 on the transport path and motions of the same along the transport path 300 from the three-dimensional transport path information 23.

[2-8] Description concerning simulation of deviation of a flexible medium:

Next will be described simulation of deviation of the flexible medium 100 to be performed by the simulation section 13 according to the present embodiment, by reference to FIGS. 26A through 27B.

Figure 26A:
FIGS. 26A and 26B are illustrations showing transport of a flexible medium along an ideal transport path.
Figure 26B:
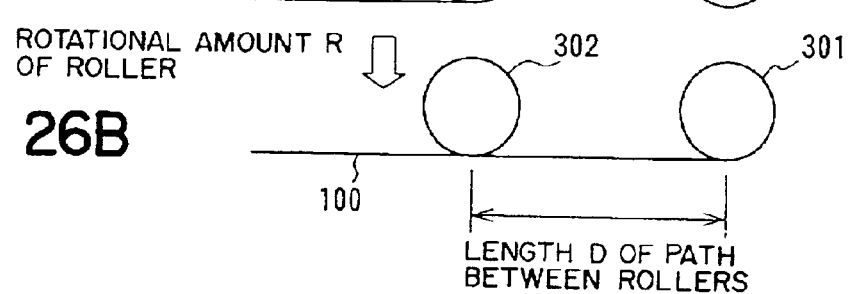
Figure 27A:
FIGS. 27A and 27B are illustrations showing transport of a flexible medium along an ideal transport path while being deviated.
Figure 27B:
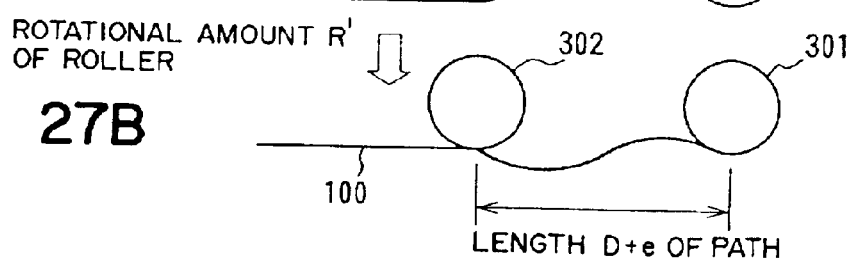

FIGS. 26A and 26B are drawings showing transport of a flexible-medium along an ideal transport path. FIGS. 27A and 27B are drawings showing transport of a flexible medium with deviation along an ideal transport path.

As mentioned previously, the simulation section 13 according to the present embodiment transports the flexible medium 100 along the preset transport path 300 in the manner as mentioned above. At the time of simulation of deviation of the flexible medium 100, the transport path 300 is set as an ideal transport path (a stationary transport path).

In real transportation, the flexible medium 100 is transported while being deviated or vibrated. Because of this, there may arise a situation in which a difference arises between positions of the flexible mediums 100 even when the flexible mediums 100 are instructed to travel the same distance.

In the present embodiment, in order to cause the simulation section 13 to reproduce this situation, the error amount setting section 16 can set an error "e" for an ideal transport path in the manner as mentioned previously.

For instance, starting from the state shown in FIG. 26A—in which the leading end of the flexible medium 100 reaches the roller 302—the flexible medium 100 is transported along an ideal transport path until the leading end reaches another roller 301. In such a case, the distance over which the leading end of the flexible medium 100 has traveled matches the length (linear length) D of the ideal transport path between the rollers 301 and 302.

At this time, provided that the travel ratio of the flexible medium 100 to the roller 302 is designated by "P", the rotation amount R required for the roller 302 to move the leading end of the flexible medium 100 from the roller 302 to the roller 301 is defined as D/P.

In contrast, the position/posture computation section 131 according to the present embodiment computes a three-dimensional transport position through use of a value which is obtained by adding the error amount "e", set by the error amount setting section 16, to the length D of a predetermined portion (e.g., a portion defined between the rollers 301 and 302) along the three-dimensional transport path set by the transport path setting section 12.

More specifically, a predetermined portion of the transport path for which an error is desired to add (i.e., a portion where deviation will arise in the flexible medium 100) is set. The ideal length of the predetermined section is D(mm). However, in the event that an error arises in the length (i.e., deviation arises in the predetermined portion), the predetermined portion is set such that the length of the portion over which the flexible medium travels is D+e (mm). The error amount "e" may be a constant value or a random value.

For instance, if the flexible medium 100 is transported, starting from the state in which the leading end reaches the roller 302 as shown in FIG. 27A, until the leading end reaches another roller 302, while being deviated with reference to the ideal transport path as shown in FIG. 27B, the distance that the leading end of the flexible medium 100 has traveled takes a value which is obtained by adding the length D to the error amount "e."

On the assumption that P is set beforehand as a travel ratio of the flexible medium 100 to the roller 302, the rotation amount R' required for the roller 302 to move the leading end of the flexible medium 100 from the roller 302 to the roller 301 is expressed by (D+e)/P.

Even when the flexible medium 100 is deviated with reference to an ideal transport path, the transport position of the flexible medium 100 is computed as if no deviation arises in the flexible medium 100. When the leading end of the flexible medium 100 enters the predetermined portion, the position/posture computation section 131 amends the preset travel ratio P by means of multiplying the ratio P by D/(D+e) and uses the thus-amended travel ratio P'=P*D/(D+e). As a result, deviation in the flexible medium 100 to be transported over the predetermined section can be simulated.

[2-9] Description concerning simulation of jamming of a flexible medium:

There will now be described the simulation, performed by the simulation section 13 according to the present embodiment, of jamming of the flexible medium 100 with reference to FIGS. 28A through 30.

Figure 28A:
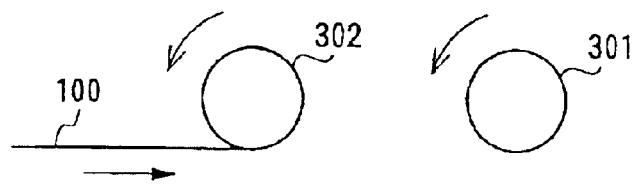
FIGS. 28A through 28C are illustrations for describing simulation of normal transport of a flexible medium.
Figure 28B:
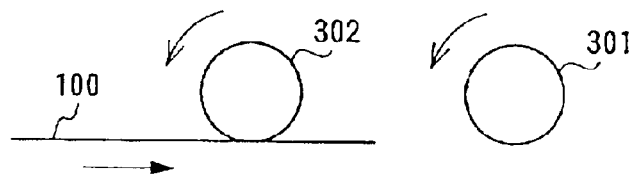
Figure 28C:
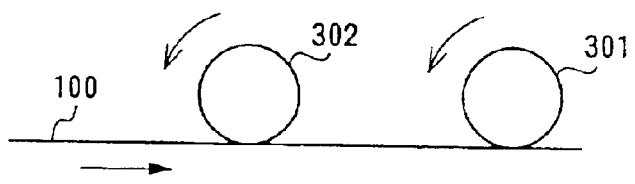
Figure 29A:
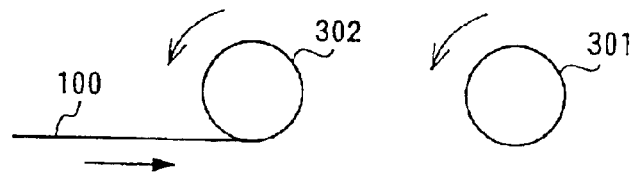
FIGS. 29A through 29C are illustrations for describing simulation of transport of a flexible medium in the event of occurrence of jamming.
Figure 29B:
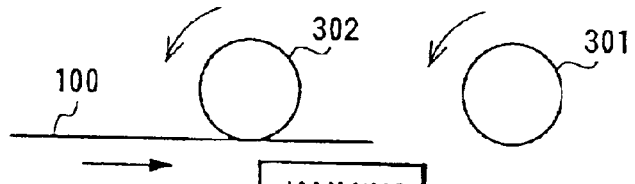
Figure 29C:
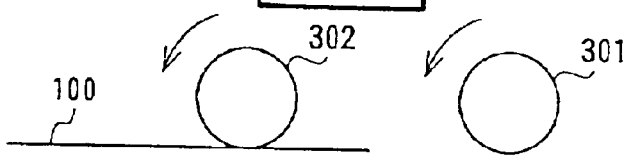
Figure 30:
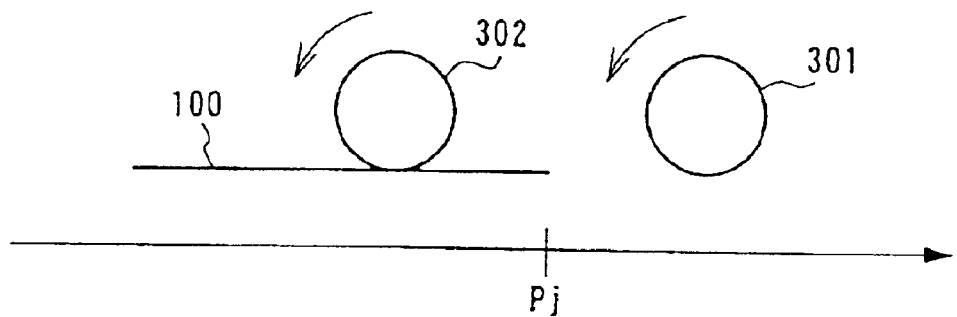
FIG. 30 is an illustration for describing a method of simulating jamming according to the present embodiment.

FIGS. 28A through 28C are drawings for describing simulation of ordinary transport. FIGS. 29A through 29C are drawings for describing simulation of transport with jamming according to the present embodiment. FIG. 30 is a drawing for describing simulation of jamming according to the present embodiment.

As sequentially shown in, e.g., FIGS. 28A through 28C, the flexible-medium 100 is transported in association with rotation of the rollers 301 and 302, in simulation of ordinary transport without troubles such as jamming.

The mechanism for transporting the flexible medium 100 is susceptible to many troubles, such as the flexible medium 100 being caught by something in the course of transport or a failure of accurate transport of the flexible medium 100 due to slippage of the rollers 301 and 302.

Accordingly, there is a necessity for reproducing such troubles in simulation, which troubles would cause a halt or a speed reduction in transport of the flexible medium 100 in terms of transport operation.

For instance, the flexible medium 100 is transported by means of the roller 302. Transport of the flexible medium 100 is stopped or decelerated when the flexible medium 100 has moved from the position shown in FIG. 29A and reached a position shown in FIG. 29B (i.e., a jamming position) in such a manner as shown in FIG. 29C. Thus, occurrence of jamming along the transport path between the rollers 301 and 302 is simulated such that the flexible medium 100 does not travel even when the roller 302 is rotated.

In the present embodiment, in order to actually reproduce and simulate such a phenomenon, a position Pj at which troubles arise (see FIG. 30) along the preset transport path is set/stored in advance as the trouble-arising position (one of the parameters 24), which is described above in the description of the position setting section 17.

As shown in FIG. 30, when the flexible medium 100 has arrived at the trouble-arising position Pj during transport simulation, the three-dimensional transport position of the flexible medium 100 is stopped at the position Pj. Alternatively, the three-dimensional transport position is computed such that the transport of the flexible medium 100 is decelerated, thereby simulating a trouble occurred in transport of the flexible medium 100 at the position Pj.

The trouble-arising position Pj may be set along the transport path in advance or randomly. Alternatively, an operator (user) may specify the trouble-arising position Pj at an arbitrary timing through use of a mouse 41 during transport simulation, thereby issuing an instruction for stopping/decelerating transport of the flexible medium 100. Upon receipt of the instruction, the position/posture computation section 131 may stop or decelerate the movement of the flexible medium 100.

[2-10] Description concerning the amount of travel of a flexible medium with respect to a roller (i.e., a travel ratio):

When the flexible-medium 100 is transported by means of a roller, the rotating speed of the roller must be related with the traveling speed of the flexible medium 100. When the flexible-medium 100 is transported by means of the roller, slippage usually arises. Hence, it is impossible to realize an ideal transport of the flexible medium 100 being free from the slippage.

Figure 31:
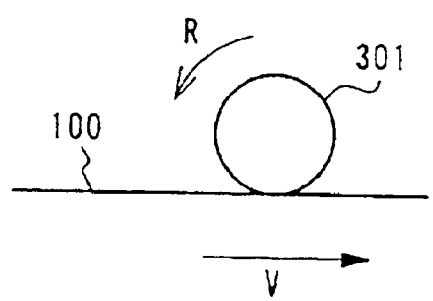
FIG. 31 is an illustration for describing a ratio of travel of a flexible medium to rotation of a roller (i.e., a travel ratio)

FIG. 31 is a drawing for describing the amount of travel of the flexible medium 100 with respect to the roller 301 (i.e., a travel ratio P). As shown in FIG. 31, when the flexible medium 100 travels by V in accordance with the rotation amount R of the roller 301, the ratio (travel ration) P of travel of the flexible medium 100 to the amount of rotation of the roller 301 is given by P=V/R. For instance, provided that "r" is the radius of the roller 301 "r" and that the unit of the rotation amount R is "degree", P=2πr/360. Here, the travel ratio P changes depending on the condition of rubber of the roller 301 or that of the flexible medium (paper sheet) 100.

In the present embodiment, the travel ratio P can be freely set by the travel ratio setting section 15. The thus-set travel ratio P is used. At the time of simulation, the angle of rotation of a roller (i.e., the rotation amount) corresponding to the travel ratio P is used as the travel amount V of the flexible medium 100, thereby enabling simulation of transport operation in various situations.

Figure 32:
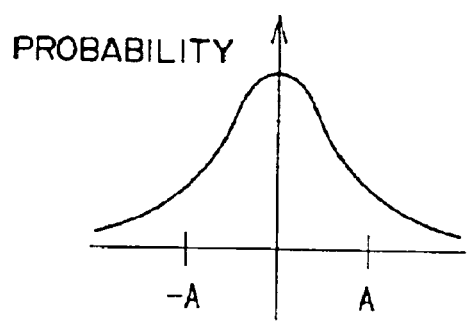
FIG. 32 is a graph showing an example statistical distribution employed in randomly setting parameters according to the present embodiment.

[2-11] Description concerning random setting of parameters:

The previously-described parameters, such as an error amount "e", the trouble-arising position Pj, and the travel ratio P between the travel amount of the roller 301 and that of the flexible medium 100, are values having a certain degree of range (i.e., variables). In the present embodiment, in order to reproduce such ranges of parameters, a normal distribution as of FIG. 32 is set based on the mean value and the standard deviation A. The parameters are randomly changed in accordance with the normal distribution. FIG. 32 is an illustration showing an example of statistical distribution (Gaussian distribution, or normal distribution) used at the random setting of the parameters in the present embodiment.

In short, when the travel ratio P is automatically set by the travel ratio setting section 15, when the error amount "e" is automatically set by the error amount setting section 16, or when the position setting section 17 automatically sets the trouble-arising position Pj, the individual setting sections 15 through 17 randomly generate and set parameters (e.g., the travel ratio P, the error amount "e," and the trouble-arising position Pj) in accordance with a predetermined statistical distribution (e.g., a normal distribution such as that shown in FIG. 32).

Alternatively, in place of the normal distribution shown in FIG. 32, a minimum/maximum value may be set, and the predetermined statistical distribution may be set as a uniform distribution. Parameters may be set or altered randomly in accordance with such a uniform distribution.

[3] Description concerning Effects of the Present Embodiment:

As mentioned above, the flexible medium transport simulation apparatus 1 according to the present embodiment yields the following effects or advantages.

[3-1] The position/posture computation section 131 three-dimensionally simulates the transport position of the flexible medium 100, 200 on the basis of the preset three-dimensional transport path. The posture of the flexible medium 100, 200 is two-dimensionally simulated. The three-dimensional image generation section 132 easily prepares three-dimensional image of the flexible medium 100, 200, by giving consideration to the dimensional information (about the length W in the widthwise direction) 22 concerning the flexible medium 100, 200, and to the three-dimensional transport position, and to the two-dimensional posture computed by the position/posture computation section 131. The thus-prepared three-dimensional images show up on the display 30. Accordingly, transport of the flexible medium 100, 200 can be three-dimensionally displayed (see, e.g., FIGS. 25A through 25C) in real time by a simple method. The user can three-dimensionally view and thoroughly perceive transport of the flexible medium 100, 200.

[3-2] Since the transport position of the flexible medium 100, 200 on the three-dimensional transport path (i.e., the transport position including width-wise deviation) is displayed, it is possible to check with ease the operating status of a sensor (not shown) detecting the widthwise position of the flexible medium 100, 200, and to check, also with ease, interference with guides (not shown) regulating widthwise movement of the flexible medium 100, 200. Deviation in the flexible medium 100, 200 in the widthwise direction (i.e., the depthwise direction) (i.e., the state of sidewise sliding or skewing) can be reproduced and displayed on the display 30.

[3—3] It is possible to immediately reflect, on the simulation of transport of the flexible medium 100, 200, the travel amount information that is entered through the mouse (or pointing device) 41 while referring to the three-dimensional images showing up on the display 30, and also is possible to three-dimensionally display, in real time, the transporting action according with the travel amount information, on the display 30. Accordingly, in a user's reviewing a design of an apparatus equipped with a transport mechanism, it is possible to display the transport operation of the flexible medium 100, 200 on the display 30 in the form of a real-time three-dimensional animation while giving instructions through the mouse 41, thereby enabling the user surely perceive the design results visually apparent on the display 30.

[3-4] The travel amount information concerning the flexible-medium can be entered into the simulation section 13, even by manipulating images of constituent components (e.g., images of rollers) of the transport mechanism through use of the mouse 41. Hence, a certain constituent component (e.g., the roller 301 or 302) is specified, and the transport of the flexible medium resulting from the operation of the constituent component can be displayed three-dimensionally on the display 30 in real time, thus facilitating the checking of the operation of the constituent component.

[3-5] The amount of control (i.e., travel amount information) output from the control program execution section 60 is immediately reflected on simulation of transport of the flexible medium 100 or 200. Transporting operation according with the amount of control can be displayed three-dimensionally on the display 30 in real time. Hence, if used in developing a control program for controlling an apparatus having a transport mechanism, the present apparatus makes it possible for the user to display on the display 30 the transport operation of the flexible medium 100, 200 associated with the control program, in the form of a real-time three-dimensional animation image. Thus, the user, or the program developer, can visually check the transporting operation with certainty, and hence the efficiency of development of a control program is greatly improved.

[3-6] The travel ratio P changes in accordance with a condition of rubber constituting the rollers 301 and 302 and a condition of the flexible-medium 100, 200. Hence, transport of the flexible-medium 100, 200 can be simulated in various situations by means of freely setting the travel ratio P through use of the travel ratio setting section 15. At this time, the travel ratio P is randomly set in accordance with a predetermined statistical distribution such as that shown in FIG. 32, whereby changes randomly arising in the situations can be reflected in simulation of transport operation.

[3-7] The simulation section 13 handles a three-dimensional model of the sheet-like flexible medium 100 (201), which model is constituted of a plurality of small component models (i.e., the strip-shaped members 101) interconnected one another so as to be mutually rotatable. Varying postures of the flexible medium 100 (201) can be three-dimensionally simulated merely by changing angles between the strip-shaped members 101 adjacent to one another. Accordingly, computation of the posture of the flexible medium 100, 201 can be significantly simplified, and a three-dimensional image of the flexible medium 100, 201 can be very easily produced.

[3-8] The three-dimensional transport path or two-dimensional posture of the flexible medium 100, 200 is expressed through use of circular arcs and straight lines. Computation of the three-dimensional transport position and two-dimensional posture of the flexible medium 100 or 200 can be facilitated greatly.

[3-9] When the travel amount information is input through the mouse 41 or the control program execution section 60 while a load center of the force applied is stationary on the flexible medium 100, the position/posture computation section 131 computes the two-dimensional posture of the flexible medium 100 from the position of the stationary load center on the flexible medium 100 and from the input travel amount information. It is thus possible to simulate the two-dimensional posture of the flexible medium 100 when the force is exerted on the position (i.e., a stationary load center) specified on the flexible-medium 100, and is also possible to display on the display 30 a three-dimensional image resultantly obtained. Accordingly, the user can three-dimensionally view and perceive a situation in which the previously-described force acts on the flexible medium 100, without fail.

[3-10] At this time, if the flexible medium is a notebook-shaped medium (bankbook) 200 consisting of a plurality of pages, the position of the stationary load center is limited on an externally-exposed leaf 201 of the notebook-shaped medium 200. Turning-over through leaves 201 can be reproduced readily.

[3-11] In a case where travel amount information is entered, by means of the mouse 41 or the control program execution section 60, while the load center of the force applied is shifted on the flexible medium 100, the position/posture computation section 131 computes the two-dimensional posture of the flexible medium 100 from the input travel amount information while perceiving the position of the shifting load center on the flexible medium 100. As a result, it is possible to simulate the two-dimensional posture of the flexible medium 100 when the flexible medium 100 is driven while being in contact with a constituent component (i.e., the roller 301 or 302) of the transport mechanism. The three-dimensional image of the simulation is displayed on the display 30. Accordingly, the user can three-dimensionally view and perceive the situation in which the flexible medium 100 is transported by the constituent elements of the transport mechanism.

[3-12] At this time, when the flexible medium is a notebook-shaped medium (bankbook) 200 consisting of a plurality of pages, page numbers are assigned to leaves 201, based on which page numbers, a leaf 201 on which a load center is located is perceived along with the position of the load center. As a result, the turning-over of all the leaves 201 through by using a constituent element (e.g., the roller 301) of the transport mechanism, can be readily reproduced on the display 30.

[3-13] The position/posture computation section 131 computes a three-dimensional transport position through use of a value which is obtained by adding a predetermined amount "e" to the length D of a predetermined portion of the three-dimensional transport path, thereby simulating deviation of the flexible medium 100 to be transported over the predetermined section. At the time of real transport, the flexible medium 100 may deviate from an ideal transport path or be vibrated. However, addition of the error amount "e" mentioned above enables very easy simulation of deviation or vibration (oscillation). At this time, random deviation can be reflected in simulation of transport operation by means of random setting of the error amount "e" in accordance with a predetermined statistical distribution as shown in FIG. 32.

[3-14] The position/posture computation section 131 fixes a three-dimensional transport position at a predetermined position Pj at a point in time when the flexible medium 100 has reached the predetermined position Pj, or computes a three-dimensional transport position such that the transport speed of the flexible medium 100 is decelerated. As a result, troubles occurred in transport of the flexible medium 100 at the predetermined position Pj can be simulated. More specifically, troubles, such as jamming of the flexible medium 100 for any reason or failure to transport the flexible medium stemming from slippage of the roller 301 or 302, can be simulated very easily. At this time, randomly-occurring troubles can be reflected in simulation of transport operation, by means of randomly setting the predetermined position Pj in accordance with a predetermined statistical distribution as shown in FIG. 32.

[3-15] The thickness "t" of the flexible medium 100, 201 is set beforehand as dimensional information 22. The simulation section 13 simulates transport of the flexible medium 100, 201 in consideration of the thickness "t." As a result, simulation of the flexible medium 100, 201 and display of a three-dimensional image becomes feasible. For instance, the loading and the stacking of the paper sheet (a flexible medium) 100 on, for example, a stacker of a copier can-be reproduced on the display 30.

[4] Others:

The present invention is not limited to the foregoing embodiment and may be susceptible to various modifications within the scope of the present invention.

Although the previous embodiment has described a case where the mouse 41 is used as a pointing device, the present invention is not limited to the embodiment; other pointing devices such as touch pens may be employed.

The previous embodiment describes a case where the flexible medium is the paper sheet 100 and where the notebook-shaped medium is the bankbook 200. However, the present invention is not limited to these cases. Other flexible sheet-like mediums, such as paper money, postcards, tickets, various types of cards, and photographic films, are also applicable in the same manner as described in the above embodiment, thus yielding the same advantageous results as those yielded in the previous embodiment.

What is claimed is:

1. A flexible medium transport simulation apparatus which simulates transport of a sheet-like flexible medium in a transport mechanism and three-dimensionally displays the simulated transport, the apparatus comprising:

a flexible medium setting section for setting the length and the width of said flexible medium as dimensional information, the length being a measurement in a transport direction in which the flexible medium is transported and the width being a measurement in a widthwise direction which is perpendicular to the transport direction with respect to a plane on which said flexible medium is transported;

a transport path setting section for setting a three-dimensional transport path covering a widthwise deviation of said flexible medium, along which path said flexible medium is transported in said transport mechanism;

a travel amount information input section for inputting travel amount information about an amount of travel of said flexible medium;

a simulation section for simulating the transport of said flexible medium carried out by said transport mechanism, by using a three-dimensional mechanism model of said transport mechanism being constructed inside said simulation section, wherein said simulation section handles said flexible medium as a three-dimensional model, the model being constituted by interconnecting a plurality of strip-shaped members so as to be rotatable about an axis parallel to said widthwise direction, said simulation section comprising:

a position/posture computation section which computes a three-dimensional transport position of said flexible medium along the three-dimensional transport path, and also computes a two-dimensional posture of said flexible medium in a plane orthogonal to the widthwise direction, on the basis of the dimensional information, which is set by said flexible medium setting section, of the three-dimensional transport path, which is set by said transport path setting section, of the travel amount information, which is input by said travel amount information input section, and of said three-dimensional model; and a three-dimensional image preparation section which prepares a three-dimensional image of said flexible medium on the basis of the three-dimensional transport position or the two-dimensional posture, which is computed by said position/posture computation section, of the dimensional information, which is set by said flexible medium setting section, and of said three-dimensional model, and outputs the three-dimensional image as the result of the simulation;

a display for displaying the transport of said flexible medium; and a display control section for controlling said display so as to display a result of the simulation performed by said simulation section.

2. A flexible medium transport simulation apparatus according to claim 1, wherein said travel amount information input section is a pointing device adapted to be operated by a user, and wherein a three-dimensional image of said flexible medium appearing on said display is operated by use of said pointing device, with the result that the amount of operation of the three-dimensional image is input to said simulation section as the travel amount information.

3. A flexible medium transport simulation apparatus according to claim 1, wherein said travel amount information input section is a pointing device adapted to be operated by a user, and wherein an image, appearing on said display, of a component of said transport mechanism, which component acts on said flexible medium, is operated by use of said pointing device, with the result that the amount of operation of the component image is input to said simulation section as the travel amount information.

4. A flexible medium transport simulation apparatus according to claim 3, further comprising a travel ratio setting section which sets a travel ratio; i.e., a ratio of a travel amount of said flexible medium to a rotation amount of a roller, in a case where said transport mechanism includes a roller which comes into contact with and acts on said flexible medium, and wherein said simulation section simulates transport of said flexible medium on the basis of the travel ratio set by said travel ratio setting section.

5. A flexible medium transport simulation apparatus according to claim 4, wherein said travel ratio setting section randomly sets the travel ratio in accordance with a predetermined statistical distribution.

6. A flexible medium transport simulation according to claim 1, wherein
said travel amount information input section is a control program execution section which executes a control program for controlling the operation of said transport mechanism and computes an amount of control of a component of said transport mechanism, which component acts on said flexible medium, and wherein
the amount of control computed by said control program execution section is input to said simulation section as the travel amount information.

7. A flexible medium transport simulation apparatus according to claim 6, further comprising a travel ratio setting section which sets a travel ratio; i.e., a ratio of a travel amount of said flexible medium to a rotation amount of a roller, in a case where said transport mechanism includes a roller which comes into contact with and acts on said flexible medium, and wherein said simulation section simulates transport of said flexible medium on the basis of the travel ratio set by said travel ratio setting section.

8. A flexible medium transport simulation apparatus according to claim 7, wherein said travel ratio setting section randomly sets the travel ratio in accordance with a predetermined statistical distribution.

9. A flexible medium transport simulation apparatus according to claim 1, wherein said transport path setting section sets the three-dimensional transport path through use of circular arcs and straight lines.

10. A flexible medium transport simulation apparatus according to claim 1, wherein said position/posture computation section approximately computes the two-dimensional posture through use of circular arcs and straight lines.

11. A flexible medium transport simulation apparatus according to claim 1, wherein said travel amount information input section inputs the travel amount information while a position of a load center of the force applied for putting said flexible medium in motion is made stationary on said flexible medium, and said position/posture computation section computes the two-dimensional posture based on the last-named travel amount information and on the position of the load center on said flexible medium.

12. A flexible medium transport simulation apparatus according to claim 11, wherein, in a case where said flexible medium is a notebook-shaped medium consisting of a plurality of leaves, the position of the load center is limited on an externally-exposed leaf of said notebook-shaped medium.

13. A flexible medium transport simulation apparatus according to claim 12, wherein, in a case where said flexible medium is a notebook-shaped medium consisting of a plurality of leaves, page numbers are assigned to respective leaves, and said position/posture computation section perceives a leaf, on which the load center is located, on the basis of the page number and further perceives the position of the load center on the leaf.

14. A flexible medium transport simulation apparatus according to claim 1, wherein said travel amount information input section inputs the travel amount information such that a position of a load center of the force applied for putting said flexible medium in motion is shifted on said flexible medium, and said position/posture computation section computes the two-dimensional posture based on the last-named travel amount information while the position of the load center on the flexible medium is perceived.

15. A flexible medium transport simulation apparatus according to claim 1, wherein said position/posture computation section computes the three-dimensional transport position, through use of a value which is obtained by adding a predetermined error amount to the length of a predetermined portion of the three-dimensional transport path, which is set by the transport path setting section, to simulate deviation of said flexible medium being transported through the predetermined portion.

16. A flexible medium transport simulation apparatus according to claim 15, further comprising an error amount setting section for randomly setting the predetermined error amount in accordance with a predetermined statistical distribution.

17. A flexible medium transport simulation apparatus according to claim 1, wherein, when said flexible medium arrives at a predetermined position, said position/posture computation section fixes the three-dimensional transport position to the predetermined position or computes the three-dimensional transport position such that a transport speed of said flexible medium is decreased, to simulate the occurrence of troubles in transport of said flexible medium at the predetermined position.

18. A flexible medium transport simulation apparatus according to claim 17, further comprising a position setting section which randomly sets said predetermined position in accordance with a predetermined statistical distribution.

19. A flexible medium transport simulation apparatus according to claim 1, wherein said flexible medium setting section further sets the thickness of said flexible medium as the dimensional information about said flexible medium, and said simulation section simulates transport of said flexible medium in consideration of the thickness set by said flexible medium setting section.

20. A method of simulating transport of a sheet-like flexible medium in a transport mechanism and three-dimensionally displaying the simulated transport, the method comprising:
a flexible medium setting step for setting the length and the width of said flexible medium as dimensional information, the length being a measurement in a transport direction in which the flexible medium is transported and the width being a measurement in a widthwise direction which is perpendicular to the transport direction with respect to a plane on which said flexible medium is transported;
a transport path setting step for setting a three-dimensional transport path covering a widthwise deviation of said flexible medium, along which path said flexible medium is transported in said transport mechanism;
a travel amount information input step for inputting travel amount information about an amount of travel of said flexible medium;
a simulation step for simulating the transport of said flexible medium carried out by said transport mechanism, with use of a three-dimensional mechanism model of said transport mechanism, wherein
said simulation step, handling said flexible medium as a three-dimensional model, the model being constituted by interconnecting a plurality of strip-shaped members so as to be rotatable about an axis parallel to said widthwise direction, includes:
a position/posture computation step for computing a three-dimensional transport position of said flexible medium along the three-dimensional transport path, and also computes a two-dimensional posture of said flexible medium in a plane orthogonal to the widthwise direction, on the basis of the dimensional information, which is set in said flexible medium setting step, of the three-dimensional transport path, which is set in said transport path setting step, of the travel amount information, which is input in said travel amount information input step and of the three-dimensional model; and a three-dimensional image preparation step for preparing a three-dimensional image of said flexible medium on the basis of the three-dimensional transport position or the two-dimensional posture, which is computed in said position/posture computation step, of the dimensional information, which is set in said flexible medium setting step, and of the three-dimensional model and outputting the three-dimensional image as the result of the simulation; and a display step for displaying the transport of said flexible medium, simulated in said simulation step, on a display.

21. A computer-readable recording medium which stores a flexible medium transport simulation program for instructing a computer to execute functions of simulating transport of a sheet-like flexible medium in a transport mechanism and of three-dimensionally displaying the simulated transport, wherein said flexible medium transport simulation program instructs the computer to function as:

a transport path selling section for selling a three-dimensional transport path covering a widthwise deviation of said flexible medium, along which path said flexible medium is transported in said transport mechanism;

a travel amount information input section for inputting travel amount information about an amount of travel, starting from a predetermined position, of said flexible medium;

a simulation section for simulating the transport of said flexible medium carried out by said transport mechanism, by using a three-dimensional mechanism model of said transport mechanism being constructed inside said simulation section; and a display control section for controlling a display so as to display a result of the simulation performed by said simulation section, the computer, when it functions as the simulation section, being instructed to handle said flexible medium as a three-dimensional model, the model being constituted by interconnecting a plurality of strip-shaped members so as to be rotatable about an axis parallel to said widthwise direction; and the computer, when it functions as the simulation section, being instructed to function as:

a position/posture computation section which computes a three-dimensional transport position of said flexible medium along the three-dimensional transport path, and also computes a two-dimensional posture of said flexible medium in a plane orthogonal to the widthwise direction, on the basis of dimensional information set in advance, of the three-dimensional transport path, which is set by said transport path selling section, of the travel amount information, which is input by said travel amount information input section and of the three-dimensional model; and a three-dimensional image preparation section which prepares a three-dimensional image of said flexible medium on the basis of the three-dimensional transport position or the two-dimensional posture, which is computed by said position/posture computation section, of the dimensional information, and of the three-dimensional model and outputs the three-dimensional image as the result of the simulation.

22. An apparatus, comprising:

a flexible medium setting section setting a length and a width of a flexible medium as dimensional information, the length being a measurement in a transport direction in which the flexible medium is transported by a transport mechanism and the width being a measurement in a widthwise direction which is perpendicular to the transport direction with respect to a plane on which said flexible medium is transported; and a simulation section simulating the transport of said flexible medium by the transport mechanism, by using a three-dimensional mechanism model of said transport mechanism being constructed inside said simulation section, wherein said simulation section handles said flexible medium as a three-dimensional model, the model being constituted by interconnecting a plurality of strip-shaped members so as to be rotatable about an axis parallel to said widthwise direction.

23. An apparatus, comprising:

means for setting the length and the width of a flexible medium as dimensional information, the length being a measurement in a transport direction in which the flexible medium is transported by a transport mechanism and the width being a measurement in a widthwise direction which is perpendicular to the transport direction with respect to a plane on which said flexible medium is transported; and means for simulating transport of said flexible medium by the transport mechanism, by using a three-dimensional mechanism model of said transport mechanism being constructed inside a simulation section, wherein said simulation section handles said flexible medium as a three-dimensional model, the model being constituted by interconnecting a plurality of strip-shaped members so as to be rotatable about an axis parallel to said widthwise direction.

* * * * *

UNITED STATES PATENT AND TRADEMARK OFFICE
CERTIFICATE OF CORRECTION

PATENT NO. : 6,950,787 B2
DATED : September 27, 2005
INVENTOR(S) : Masayioshi Hashima et al.

It is certified that error appears in the above-identified patent and that said Letters Patent is hereby corrected as shown below:

<u>Title page,</u>
Item [56], References Cited, U.S. PATENT DOCUMENTS, after "Shimomura et al." insert -- G06F/9/455 --.

<u>Column 41,</u>
Line 26, after "path" delete "selling" and insert -- setting --.
Line 26, after "for" delete "selling" and insert -- setting --.

<u>Column 42,</u>
Line 4, delete "selling" and insert -- setting --.

Signed and Sealed this

Eleventh Day of April, 2006

JON W. DUDAS
*Director of the United States Patent and Trademark Office*